United States Patent
Otake et al.

(10) Patent No.: US 9,658,805 B2
(45) Date of Patent: May 23, 2017

(54) INFORMATION PROCESSING APPARATUS, SYSTEM, STORAGE MEDIUM, AND INFORMATION PROCESSING METHOD FOR ESTABLISHING COMMUNICATION PATH

(71) Applicant: FUJI XEROX CO., LTD., Tokyo (JP)

(72) Inventors: Shin Otake, Kanagawa (JP); Tomohisa Ishikawa, Kanagawa (JP); Yoshihiro Takeshita, Kanagawa (JP); Yang Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/814,640

(22) Filed: Jul. 31, 2015

(65) Prior Publication Data

US 2016/0085488 A1 Mar. 24, 2016

(30) Foreign Application Priority Data

Sep. 24, 2014 (JP) ................. 2014-193648

(51) Int. Cl.
*G06K 15/00* (2006.01)
*G06F 3/12* (2006.01)
(Continued)

(52) U.S. Cl.
CPC ............ *G06F 3/1236* (2013.01); *G06F 21/31* (2013.01); *G06F 21/608* (2013.01); *H04L 63/08* (2013.01); *H04N 1/00127* (2013.01); *H04W 12/06* (2013.01); *G06F 3/1222* (2013.01); *G06F 3/1238* (2013.01); *G06F 3/1292* (2013.01); *H04W 76/023* (2013.01)

(58) Field of Classification Search
None
See application file for complete search history.

(56) References Cited

U.S. PATENT DOCUMENTS 6,507,567 B1 * 1/2003 Willars ................. H04W 76/04
370/321
8,643,861 B2 * 2/2014 Takeishi ............. G06K 15/1856
358/1.13
(Continued)

FOREIGN PATENT DOCUMENTS

JP 2013-256016 A 12/2013

*Primary Examiner* — Miya J Williams
(74) *Attorney, Agent, or Firm* — Sughrue Mion, PLLC

(57) ABSTRACT

An information processing apparatus includes a first receiving unit that receives authentication information from software that functions as a web client through a first communication path using a first communication protocol; a transmitting unit that, if authentication using the received authentication information is successful, permits communication through the first communication path, and transmits access permission information to the software through the first communication path; a second receiving unit that receives an establishment request for a second communication path using a second communication protocol different from the first communication protocol, from the software; and an establishing unit that, if the transmitted access permission information is included in the received establishment request, establishes the second communication path to the software.

15 Claims, 17 Drawing Sheets

(51) Int. Cl.
*H04N 1/00* (2006.01)
*H04W 12/06* (2009.01)
*G06F 21/31* (2013.01)
*G06F 21/60* (2013.01)
*H04L 29/06* (2006.01)
*H04W 76/02* (2009.01)

(56) References Cited

U.S. PATENT DOCUMENTS

| | | | |
|---|---|---|---|
| 9,036,192 B2* | 5/2015 | Watanabe | G06F 3/1212 |
| | | | 358/1.13 |
| 9,154,485 B1* | 10/2015 | Fallows | H04L 63/08 |
| 2003/0021394 A1* | 1/2003 | Krack | H04M 3/533 |
| | | | 379/88.01 |
| 2009/0036056 A1* | 2/2009 | Oshima | H04M 1/7253 |
| | | | 455/41.3 |
| 2014/0092418 A1* | 4/2014 | Kishimoto | H04N 1/00896 |
| | | | 358/1.14 |
| 2014/0157392 A1* | 6/2014 | Smith | H04L 63/08 |
| | | | 726/9 |
| 2014/0240753 A1* | 8/2014 | Anno | G06F 3/1236 |
| | | | 358/1.15 |
| 2015/0138582 A1* | 5/2015 | Ito | H04N 1/00925 |
| | | | 358/1.13 |
| 2016/0044719 A1* | 2/2016 | Sidhu | H04W 76/021 |
| | | | 370/329 |

* cited by examiner

COPY IS IN PROCESS.

C11

NUMBER OF COPIES: 1 / 3
NUMBER OF PAGES: 2 / 10

MONOCHROME
A4
100%
SORT

COPY IS COMPLETED.

C21

NUMBER OF COPIES: 3 / 3
NUMBER OF PAGES: 10 / 10

MONOCHROME
A4
100%
SORT

PAPER HOUSING PORTION IS NOT SET.

NUMBER OF COPIES: 2 / 3
NUMBER OF PAGES: 5 / 10

MONOCHROME
A4
100%
SORT

FIG. 17

| USER ID | ACCESS TOKEN | LOG-IN STATE | CONNECTION STATE |
|---------|--------------|--------------|------------------|
| user01 | ... | LOGGED-IN | DISCONNECTED |
| user02 | ... | LOGGED-OFF | DISCONNECTED |
| user03 | ... | LOGGED-IN | CONNECTED |
| user04 | ... | LOGGED-OFF | DISCONNECTED |
| ⋮ | ⋮ | ⋮ | ⋮ |

INFORMATION PROCESSING APPARATUS, SYSTEM, STORAGE MEDIUM, AND INFORMATION PROCESSING METHOD FOR ESTABLISHING COMMUNICATION PATH

CROSS-REFERENCE TO RELATED APPLICATIONS

This application is based on and claims priority under 35 USC 119 from Japanese Patent Application No. 2014-193648 filed Sep. 24, 2014.

BACKGROUND

The present invention relates to an information processing apparatus, a system, a storage medium, and an information processing method.

SUMMARY

According to an aspect of the invention, there is provided an information processing apparatus including a first receiving unit that receives authentication information from software that functions as a web client through a first communication path using a first communication protocol; a transmitting unit that, if authentication using the received authentication information is successful, permits communication through the first communication path, and transmits access permission information to the software through the first communication path; a second receiving unit that receives an establishment request for a second communication path using a second communication protocol different from the first communication protocol, from the software; and an establishing unit that, if the transmitted access permission information is included in the received establishment request, establishes the second communication path to the software.

BRIEF DESCRIPTION OF THE DRAWINGS

An exemplary embodiment of the present invention will be described in detail based on the following figures, wherein:

FIGS. 3A and 3B are illustrations each showing an example of displayed status information;

FIG. 10 is an illustration showing an example of displayed status information;

FIG. 17 is an illustration showing an example of contents of a user management table;

DETAILED DESCRIPTION

1. Exemplary Embodiment

A general configuration, a hardware configuration, and a functional configuration of an information processing system according to an exemplary embodiment are described first with reference to FIGS. 1 to 11.

1-1. General Configuration

Figure 1:
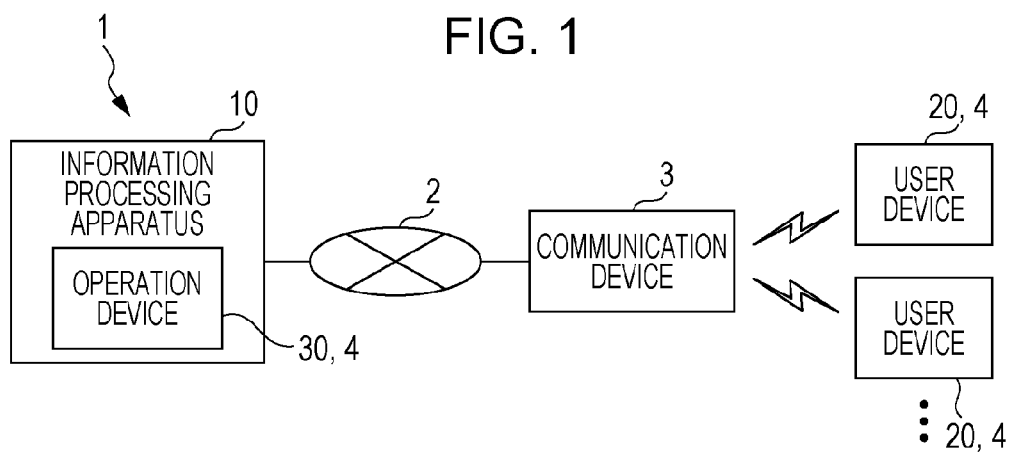
FIG. 1 is a block diagram showing an example of a general configuration of an information processing system according to an exemplary embodiment.

FIG. 1 is a block diagram showing an example of a general configuration of an information processing system. FIG. 1 shows an information processing system 1 including a communication line 2, a communication device 3, an information processing apparatus 10, and plural user devices 20. The information processing system 1 is a system that provides various functions, such as copy, scan, FAX (facsimile), and print (output of image data to medium).

The communication line 2 is a system for communication including at least one of the Internet, a mobile communication network, a telephone line, and the like. The communication line 2 provides communication among apparatuses and devices connected to the system. The communication line 2 is connected to the information processing apparatus 10 and the communication device 3. The communication device 3 is a device having a communication function. In this exemplary embodiment, the communication device 3 executes wireless communication conforming to the standard of wireless LAN. The communication device 3 executes wireless communication with the user device 20, and communicates with the information processing apparatus 10 through the communication line 2. That is, the information processing apparatus 10 communicates with the user device 20 through the communication line 2 and the communication device 3. Alternatively, the information processing apparatus 10 and the user device 20 may directly communicate with each other without the communication device 3.

The information processing apparatus 10 is an apparatus that executes image forming processing of forming an image on a medium and image reading processing of reading an image formed on a medium. These processing are executed when the above-described function of, for example, copy, scan, FAX, or print is provided. The information processing apparatus 10 includes an operation device 30 used for operating the information processing apparatus 10. The operation device 30 is a device to operate the information processing apparatus 10, and is so-called control panel. The operation device 30 is fixed to the housing of the information processing apparatus 10, and is used by a user who comes to a location where the information processing apparatus 10 is installed. The operation device 30 includes, for example, a liquid crystal display. The operation device 30 displays image data to operate the information processing apparatus 10 (hereinafter, referred to as "operation image data") on the display. An operation image displayed on the basis of the operation image data is described with reference to FIG. 2.

Figure 2:
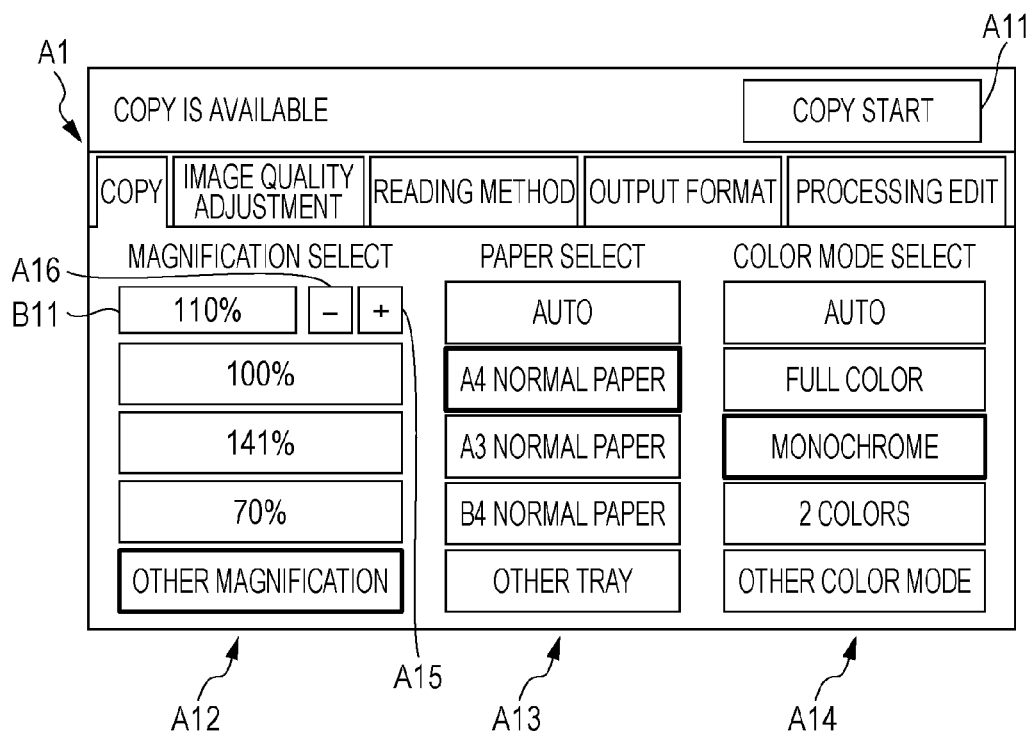
FIG. 2 is an illustration showing an example of a displayed operation image.

FIG. 2 is an illustration showing an example of an operation image displayed on the operation device 30. In the example in FIG. 2, an operation image data group A1 to use the copy function is displayed. The operation image data group A1 includes, for example, operation image data A11 for start of copy, operation image data A12 for selection of magnification, operation image data A13 for selection of paper, and operation image data A14 for selection of color mode. By tapping (lightly touching) the operation image data A11, a user executes an operation corresponding to the operation image data A11, that is, an operation to start copy. When an operation is made on the displayed operation image data, the operation device 30 requests the information processing apparatus 10 for processing corresponding to the operation. If the operation image data A11 is operated, the operation device 30 requests the information processing apparatus 10 for processing to provide the copy function (specifically, series of processing including image reading processing and image forming processing, hereinafter, referred to as "copy processing").

The description returns to FIG. 1. The user device 20 is a device, for example, a tablet terminal or a personal computer. The user device 20 may be used when carried by a user or when placed on a desk. Also, the user device 20 may be used for other purpose (for example, business operations of a company) without limiting to the operation of the information processing apparatus 10. The user device 20 displays operation image data, and when an operation is made on the displayed operation image data, the user device 20 requests the information processing apparatus 10 for processing corresponding to the operation. This point is common to the operation device 30.

When the information processing apparatus 10 executes processing based on a request from the operation device 30 or the user device 20, the information processing apparatus 10 transmits information indicating the status of the processing being executed (hereinafter, referred to as "status information") to the device, and thus notifies the device about the status of the processing. For example, if the copy function is used, the status information is information indicating the status of processing, such as the number of media from which images are read, the number of media on which images are formed, etc.

FIGS. 3A and 3B are illustrations each showing an example of displayed status information. When the information processing apparatus 10 executes, for example, the copy processing, as shown in FIG. 3A, the information processing apparatus 10 transmits status information C1 including sheet number information C11 indicating the number of completed sheets of copy (the number of copies and the number of pages), a character string describing "copy is in process," and parameters of copy, such as "monotone," "A4," "100%," and "sort."

Also, when the copy processing progresses and copy is completed by the requested number of sheets, as shown in FIG. 3B, the information processing apparatus 10 transmits status information C2 including sheet number information C21 indicating completion of copy by the requested number of sheets, and a character string describing "copy is completed." The sheet number information C11 and the sheet number information C21 are each indicated by a mixed number having the number of sheets requested for copy as the denominator and the number of completed sheets of copy as the numerator. As described above, the status information includes information indicating the progress of processing, information indicating the result of the processing, and information of parameters used for the processing. The operation device 30 and the user device 20 each serve as a display device that displays the notified status as shown in FIGS. 3A and 3B. Hereinafter, the operation device 30 and the user device 20 are collectively called display device 4 unless otherwise distinguished from one another.

1-2. Hardware Configuration

Figure 4:
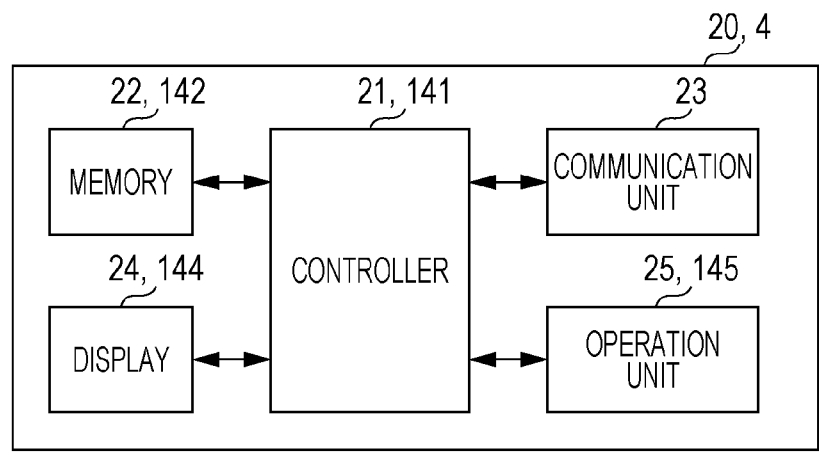
FIG. 4 is a block diagram showing an example of a hardware configuration of a user device.

FIG. 4 is a block diagram showing an example of a hardware configuration of the user device 20. The user device 20 includes a controller 21, a memory 22, a communication unit 23, a display 24, and an operation unit 25. The controller 21 includes CPU (Central Processing Unit), ROM (Read Only Memory), RAM (Random Access Memory), and a real-time clock (any of these units not shown). The CPU uses the RAM as a work area and executes a program stored in the ROM or the memory 22, and hence the controller 21 controls the operations of the respective units. The real-time clock calculates the current date and time and notifies the CPU about the date and time.

The memory 22 includes, for example, a hard disk drive. The memory 22 stores data, a program, and image data used by the controller 21 for the control. The communication unit 23 is a communication unit including a communication circuit and an antenna for executing wireless communication conforming to the standard of wireless LAN (Local Area Network). The communication unit 23 executes wireless communication with, for example, the communication device 3 shown in FIG. 1. The display 24 includes, for example, a liquid crystal display. The display 24 is controlled by the controller 21 and displays an image on a display screen. The operation unit 25 includes a touch sensor (also called touch screen or touch panel) overlaid on the display screen and a button etc. provided at the housing if the user device 20 is a tablet terminal. The operation unit 25 receives an operation by a user such as the tapping, and supplies operation data indicating the content of the operation to the controller 21. Alternatively, if the user device 20 is a personal computer, the operation unit 25 may include a keyboard and a mouse. The controller 21 executes control in accordance with supplied operation data.

Figure 5:
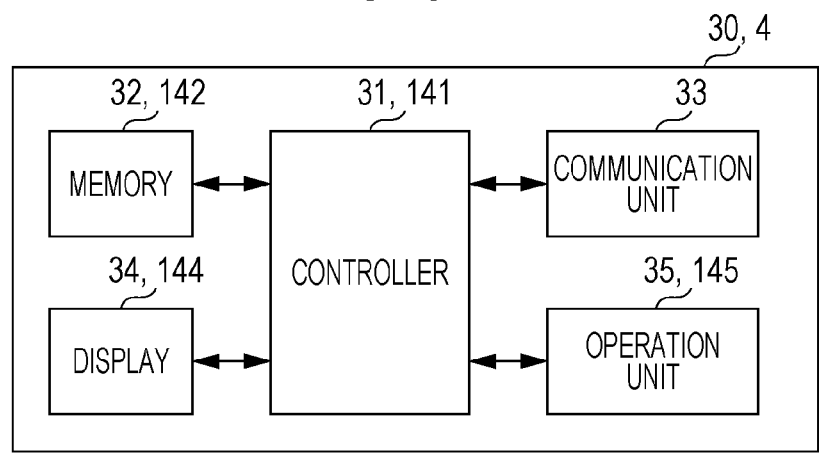
FIG. 5 is a block diagram showing an example of a hardware configuration of an operation device.

FIG. 5 is a block diagram showing an example of a hardware configuration of the operation device 30. The operation device 30 includes a controller 31, a memory 32, a communication unit 33, a display 34, and an operation unit 35. Hereinafter, common names are applied to blocks (respective units excluding the communication unit 33) indicating the hardware common to the blocks shown in FIG. 4, and the description is omitted. The communication unit 33 is a communication unit including a communication circuit that executes communication conforming to the standard of wired LAN, and a port to which a connector of a communication cable (specifically, a LAN cable) is inserted.

As described above, the operation device 30 and the user device 20 are called display device 4 unless otherwise distinguished from one another. Accordingly, when the controller 31 and the controller 21 do not have to be distinguished from one another, the controllers 31 and 21 are collectively called "controller 141." When the memory 32 and the memory 22 do not have to be distinguished from one another, the memories 32 and 22 are collectively called "memory 142." When the display 34 and the display 24 do not have to be distinguished from one another, the displays 34 and 24 are collectively called "display 144." When the operation unit 35 and the operation unit 25 do not have to be distinguished from one another, the operation units 35 and 25 are collectively called "operation unit 145."

Figure 6:
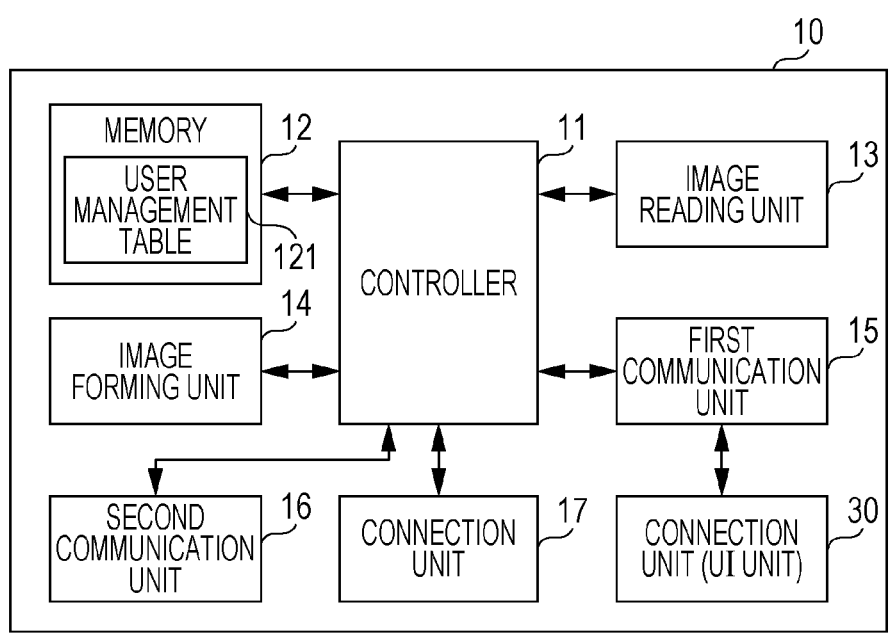
FIG. 6 is a block diagram showing an example of a hardware configuration of an information processing apparatus.

FIG. 6 is a block diagram showing an example of a hardware configuration of the information processing apparatus 10. The information processing apparatus 10 includes a controller 11, a memory 12, an image reading unit 13, an image forming unit 14, a first communication unit 15, a second communication unit 16, and a connection unit 17. Hereinafter, common names are applied to blocks (the controller 11 and the memory 12) indicating the hardware common to the blocks shown in FIGS. 4 and 5, and the description is omitted. Also, the information processing apparatus 10 includes the operation device 30 that functions as a UI (User Interface) unit. In this exemplary embodiment, the controller 11 controls respective units excluding the operation device 30.

The image reading unit 13 executes image reading processing of reading an image on a document by using, for example, a CCD (Charge Coupled Devices) system. The image reading unit 13 optically reads an image of a content formed on a medium such as paper, and supplies image data indicating the read image to the controller 11. The image forming unit 14 executes image forming processing of forming an image on a medium by using, for example, an electrophotographic system. The image forming unit 14 forms an image indicated by the image data supplied from the controller 11, on a medium such as paper. The above-described systems used for reading an image and forming an image are each merely an example, and other system may be used.

The first communication unit 15 is connected to the communication unit 33 of the operation device 30 through a communication cable and a data bus, and communicates with the operation device 30 without the above-described external device. That is, the communication unit 33 also communicates with the information processing apparatus 10 without the above-described external device. The second communication unit 16 includes a communication circuit that makes communication conforming to the standard of wired LAN or wireless LAN, a port to which a connector of a communication cable (a LAN cable) is inserted, and a wireless transmitting/receiving device conforming to the standard of wireless LAN, as a communication interface, and executes communication processing of communicating with a device connected through the interface. The second communication unit 16 is connected to the communication line 2 shown in FIG. 1, and communicates with, for example, the user device 20 through an external device (being an external device for the information processing apparatus 10 and being, for example, the communication device 3).

The connection unit 17 has a slot or the like to which a storage medium such as a SD memory card is connected, and is connected to the storage medium. The controller 11 reads data stored in the storage medium and writes data in the storage medium through the connection unit 17. The operation device 30 has the configuration described with reference to FIG. 5, and communicates with the first communication unit 15. By executing this communication, the operation device 30 functions as a user interface unit (UI unit) that displays an image indicated by data transmitted from the controller 11, and that transmits data for operating the information processing apparatus 10 to the controller 11.

1-3. Functional Configuration

Figure 7:
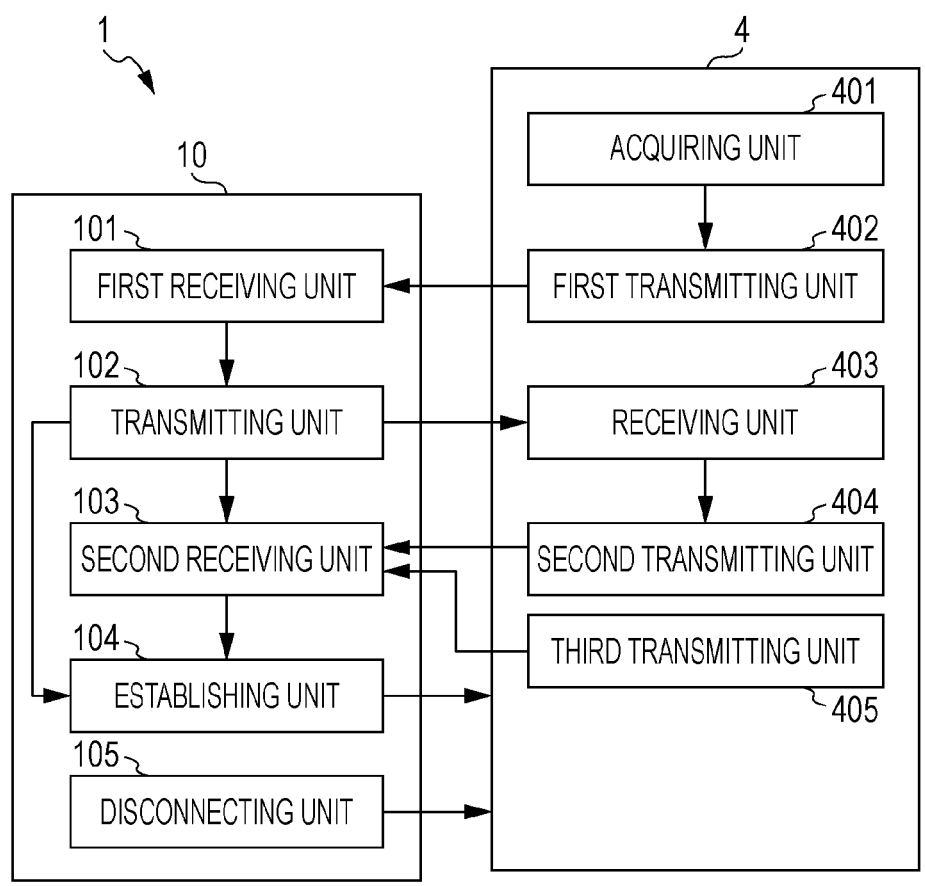
FIG. 7 is a block diagram showing an example of a functional configuration of the information processing system.

FIG. 7 is a block diagram showing an example of a functional configuration of the information processing system 1. The information processing system 1 includes the information processing apparatus 10 (an example of a first information processing apparatus) and the display device 4 (that is, the operation device 30 or the user device 20 (an example of a second information processing apparatus)). The information processing apparatus 10 includes a first receiving unit 101, a transmitting unit 102, a second receiving unit 103, an establishing unit 104, and a disconnecting unit 105. The first receiving unit 101 receives authentication information from software that functions as a web client through a first communication path using a first communication protocol.

If authentication using the authentication information received by the first receiving unit 101 is successful, the transmitting unit 102 permits communication through the first communication path and transmits an access token (an example of access permission information) as information for permitting an access to the software through the first communication path. The second receiving unit 103 receives an establishment request for a second communication path using a second communication protocol different from the first communication protocol, from the software. If the access token transmitted from the transmitting unit 102 is included in the establishment requirement received by the second receiving unit 103, the establishing unit 104 establishes the second communication path to the above-described software.

If the second communication path established by the establishing unit 104 is disconnected, the disconnecting unit 105 disconnects the first communication path to the software to which the disconnected second communication path has been established. In this example, the controller 11 of the information processing apparatus 10, or the controller 11 and the first communication unit 15 are an example of the first receiving unit 101, the transmitting unit 102, the second receiving unit 103, the establishing unit 104, and the disconnecting unit 105.

Alternatively, if the second communication path is disconnected, the disconnecting unit 105 may determine whether the first communication path is disconnected or not in accordance with the priority of the web client. For example, the disconnecting unit 105 does not disconnect the first communication path if the web client is a local UI unit (the operation device 30) and hence has high reliability; but disconnects the first communication path if the web client is a remote UI unit (the user device 20) and hence has low reliability. Alternatively, the disconnecting unit 105 may record the connection history of the web client, and in case of the web client with the connection history recorded, the disconnecting unit 105 may not disconnect the first communication path.

The display device 4 includes an acquiring unit 401, a first transmitting unit 402, a receiving unit 403, a second transmitting unit 404, and a third transmitting unit 405. The acquiring unit 401 acquires authentication information. The first transmitting unit 402 transmits the authentication information acquired by the acquiring unit 401 to software that functions as a server through the first communication path using the first communication protocol. The receiving unit 403 receives an access token from the software through the first communication path. The second transmitting unit 404 transmits an establishment request for the second communication path using the second communication protocol to the software, the establishment request including the access token received by the receiving unit 403.

If the second communication path is disconnected, the third transmitting unit 405 transmits the establishment request for the second communication path including the access token received by the receiving unit 403 to the software through the first communication path. In this example, the controller 21 of the user device 20, the controller 21 and the communication unit 23 of the user device 20, the controller 31 of the operation device 30, and the controller 31 and the communication unit 33 of the operation device 30 are an example of the first receiving unit 101, the transmitting unit 102, the second receiving unit 103, the establishing unit 104, and the disconnecting unit 105.

1-4. Layer Structure

Figure 8:
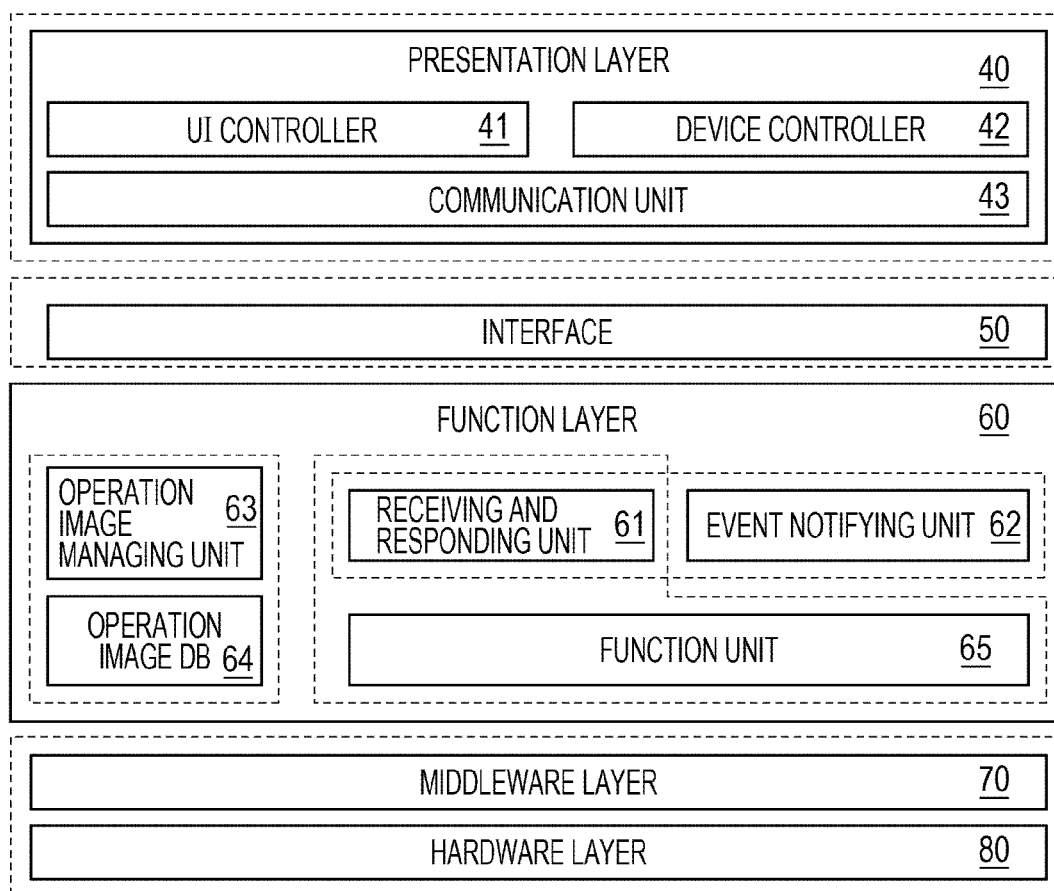
FIG. 8 is an illustration showing an example of a layer structure indicating a configuration of the information processing system.

FIG. 8 is an illustration showing an example of a layer structure indicating a configuration of the information processing system 1. The information processing system 1 includes a presentation layer 40, an interface 50, a function layer 60, a middleware layer 70, and a hardware layer 80. The presentation layer 40 is realized such that the controller 141 of the display device 4 (that is, the operation device 30 and the user device 20) executes a program stored in the memory 142. The presentation layer 40 is an example of software that functions as a web client. The interface 50, the function layer 60, and the middleware layer 70 are realized such that the controller 11 of the information processing apparatus 10 executes a program stored in the memory 12. At least one of the interface 50, the function layer 60, and the middleware layer 70 is an example of software that functions as a server. The hardware layer 80 is a group of hardware resources of the information processing apparatus 10, and is controlled by the middleware layer 70.

In this exemplary embodiment, the presentation layer 40 (that is, the display device 4) and the interface 50 (that is, the information processing apparatus 10) communicate with each other under the standard of WWW (World Wide Web, hereinafter, referred to as "web"). In this example, the presentation layer 40 and the interface 50 communicate with each other by using HTTP (Hypertext Transfer Protocol) and WebSocket.

If the display device 4 is the user device 20, the information processing apparatus 10 and the user device 20 (that is, the presentation layer 40 and the interface 50) transmit and receive data through the communication line 2 and the communication device 3 as described above with reference to FIG. 1. That is, in this case, communication is executed through a communication device which is not the information processing apparatus 10 or the user device 20 (for example, the communication device 3 or a communication device connected to the communication line 2, hereinafter, referred to as "other communication device"). If the display device 4 is the operation device 30, the information processing apparatus 10 and the operation device 30 (that is, the presentation layer 40 and the interface 50) transmit and receive data through a cable connected to the first communication unit 15 as described above with reference to FIG. 6. That is, in this case, communication without the above-described other communication device is executed. The above-described communication device may include, for example, a router, a hub, and a bridge connected to the communication line 2 in addition to the communication device 3.

1-4-1. Presentation Layer 40

The presentation layer 40 corresponding to the operation device 30 or the user device 20 realizes a function that receives an operation by a user (that is, a user interface). The presentation layer 40 includes a UI controller 41, a device controller 42, and a communication unit 43. The UI controller 41 is a unit that controls the user interface. The UI controller 41 displays the above-described operation image and status information transmitted from the interface 50 (that is, the information processing apparatus 10) on the display 144, and receives an operation by the user in accordance with data supplied from the operation unit 145. To be specific, for example, the UI controller 41 displays the status information C1 and the status information C2 described above with reference to FIG. 3. Other example of status information is described below with reference to FIGS. 10, 11A, and 11B.

FIG. 10 is an illustration showing an example of displayed status information. In this example, there is displayed status information that is displayed if a housing portion that houses media is opened by the user. To be specific, status information C3 including a character string describing "paper housing portion is not set" is displayed.

Figure 11A:
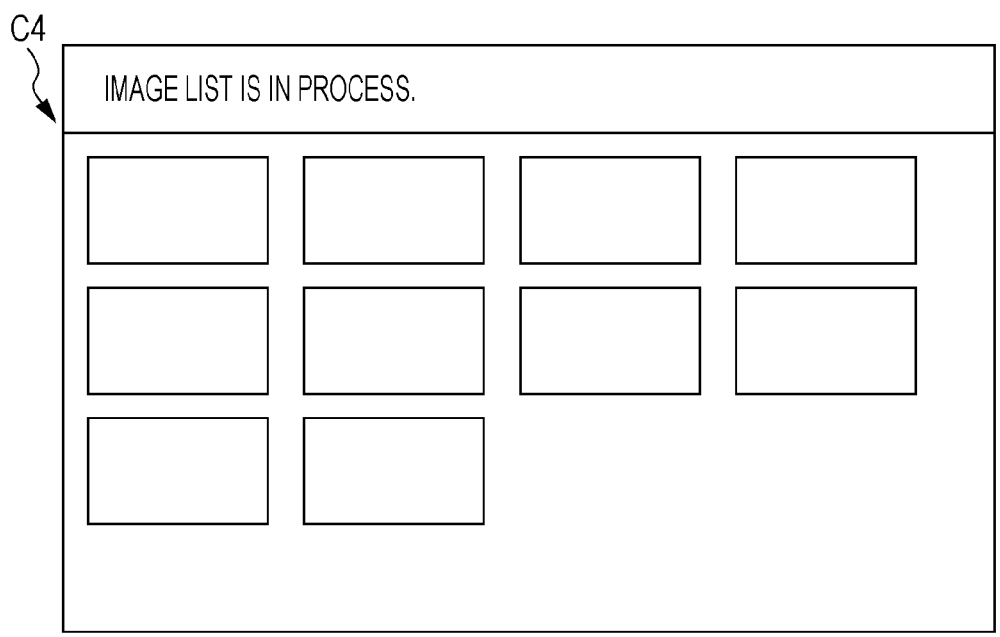
FIGS. 11A and 11B are illustrations each showing an example of displayed status information.
Figure 11B:
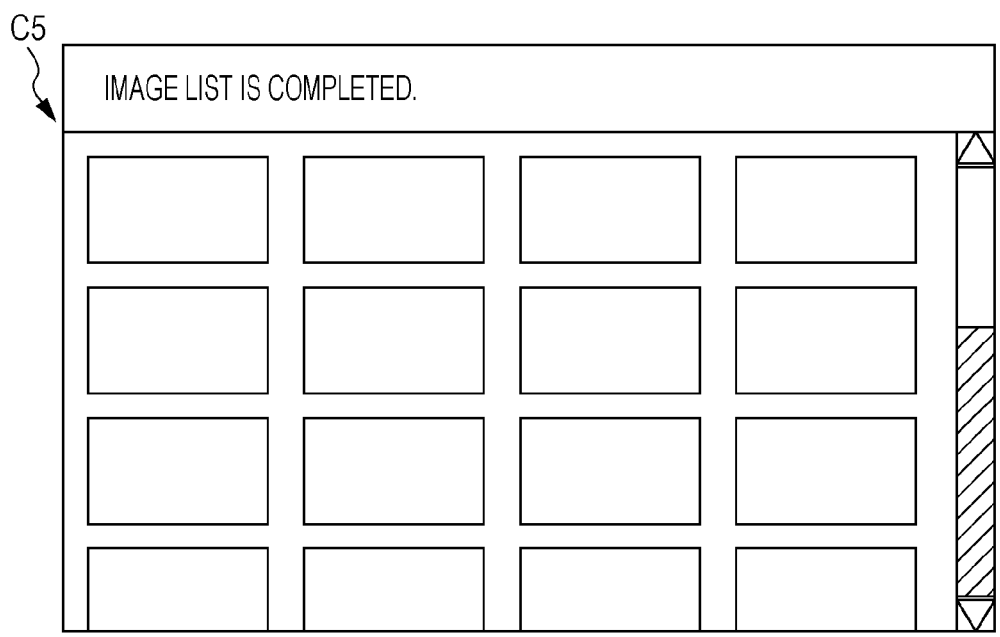

FIGS. 11A and 11B are illustrations each showing another example of displayed status information. In this example, when a storage medium such as a SD memory card storing plural images is connected to the connection unit 17 of the information processing apparatus 10 shown in FIG. 6, the status and result of processing of displaying a list of thumbnail images for the images stored in the storage medium are displayed. FIG. 11A shows status information C4 including a character string describing "image list is in process" and thumbnail images generated from read images (in this example, 10 thumbnail images). FIG. 11B shows status information C5 including a character string describing "image list is completed" and a list of thumbnail images generated from all images read from the storage medium.

Also, the user executes an operation to make an access to URL (Uniform Resource Locator) of the information processing apparatus 10, and hence the UI controller 41 transmits a request for operation image data to the interface 50 of the information processing apparatus 10. Also, the UI controller 41 displays the operation image data transmitted from an operation image managing unit 63 of the information processing apparatus 10 on the display 144 as a response to the transmitted request for the operation image data. To be more specific, the UI controller 41 displays an operation image based on parameters, such as the arrangement and size of the operation image, presented by the operation image data. The operation image displayed in this way is, for example, the operation image data group A1 shown in FIG. 2. An example of information configuring the operation image data is a file described in HTML (Hypertext Markup Language) form. The UI controller 41 interprets the acquired file in HTML form and controls the operation image to be displayed and operation information to be received.

The operation image data group A1 includes operation image data for selection of parameters, such as a magnification of an image to be copied, a sheet of paper on which a copied image is formed, and a color mode of the image to be copied. The user operates the operation image data, and hence the UI controller 41 changes the image indicating the parameters into a display form indicating the selected parameters and displays the image. FIG. 2 is an example showing an image including a character string indicating a magnification of copy (in this example, "110%" (B11)) that is currently selected and operation image data indicating a sheet of paper and a color mode that are currently selected (in this example, character strings describing "other magnification," "A4 normal paper," "monotone") in a form different from a selection image that is not selected (in this example, a form with a thick line is employed, or a form of highlight or radio buttons may be alternatively employed).

The operation image data group A1 includes the operation image data A11 to start copy. When the operation image data A11 is operated, the function layer 60 is requested for copy processing using the currently selected parameters through the interface 50. As described above, the operation image data A11 is an image for determining the content to be requested to the information processing apparatus 10.

The description returns to FIG. 8. The UI controller 41 supplies data relating to the displayed operation image data to the device controller 42. The data relating to the operation image data is data used for determining whether the operation image data is operated or not, and is data indicating, for example, a region where the operation image data is displayed (for example, a region of a button image or an icon image). Also, the UI controller 41 supplies the data indicating the content of the parameters to the device controller 42 based on the display form of the image indicating the parameters displayed as described above.

The device controller 42 requests the function layer 60 to execute processing through the interface 50 based on an operation by the user. When the operation on the operation image data is executed by the user, the device controller 42 requests the information processing apparatus 10 for processing corresponding to the operation by the user based on data supplied from the UI controller 41. For example, when the user taps the touch sensor of the operation unit 145, the device controller 42 determines whether the tapped position is included in the region of the operation image data based on the data supplied from the UI controller 41. If it is determined that the tapped position is included in the region of the operation image data, the device controller 42 receives the operation on the operation image displayed in the region of the operation image data.

If the device controller 42 receives the operation on the image for determining the above-described request content (in the example in FIG. 2, the operation image data A11), the device controller 42 requests the information processing apparatus 10 for processing indicated by the image by using the parameters indicated by the data supplied from the UI controller 41. If the operation is made on the operation image data A11 in the state shown in FIG. 2, the device controller 42 requests the information processing apparatus 10 for processing for copy with a magnification of 110%, on a sheet of A4 normal paper, in monotone.

In this example, the device controller 42 generates data describing an instruction indicating that processing corresponding to an operated image (an image that determines a request content) (in this example, the processing being copy processing) is executed by using parameters set by the operation (hereinafter, the data being referred to as "instruction data"). In this exemplary embodiment, the instruction data is described in XML (Extensible Markup Language). The device controller 42 generates a HTTP (Hypertext Transfer Protocol) request including the generated instruction data. The device controller 42 requests the function layer 60 for processing by transmitting the generated HTTP request to the interface 50. The HTTP request to be transmitted to the interface 50 so that the device controller 42 makes a request for processing is referred to as "processing request" hereinafter. A processing request including instruction data is generated if the copy processing is requested; however, a processing request may not include instruction data depending on processing to be requested. For example, if processing of turning off the power of the information processing apparatus 10 is requested, the processing request does not include instruction data.

The communication unit 43 controls communication of the UI controller 41 and the device controller 42 with the interface 50.

1-4-2. Interface 50

The interface 50 is a layer that realizes a function of providing connection between the presentation layer 40 and the function layer 60. The connection between the presentation layer 40 and the interface 50 includes connection through an external device having a communication function such as the communication device 3 shown in FIG. 1 (connection with the user device 20) and connection without such an external device (connection with the operation device 30). The interface 50 provides communication between the user device 20 and the operation device 30 by a common communication process (a process of communication conforming to the standard, such as HTTP or WebSocket). For example, the interface 50 receives a HTTP request transmitted from the presentation layer 40 and supplies the HTTP request to the function layer 60, and receives a HTTP response supplied from the function layer 60 in response to the HTTP request and transmits the HTTP response to the presentation layer 40.

1-4-3. Function Layer 60

The function layer 60 is a layer that realizes a function of processing data to meet the purpose of use, such as the copy function and scan function. The function layer 60 includes a receiving and responding unit 61, an event notifying unit 62, an operation image managing unit 63, an operation image DB (Data Base) 64, and a function unit 65 that provides the copy function, scan function, etc.

The receiving and responding unit 61 receives a processing request transmitted from the presentation layer 40 through the interface 50, and requests the function unit 65 for processing. At this time, the receiving and responding unit 61 issues a transaction ID as information for identifying the requested processing. Also, the receiving and responding unit 61 issues a client ID as information for identifying a request source (the display device 4) which has requested the processing. The receiving and responding unit 61 causes the memory 12 to store the issued transaction ID and client ID, and a communication target address of the display device 4 of the request source, in an associated manner. The receiving and responding unit 61 supplies the issued transaction ID to the function unit 65 when the receiving and responding unit 61 requests the function unit 65 for the processing. Also, the receiving and responding unit 61 transmits a response to the received request, to the presentation layer 40 through the interface 50. The response may indicate only reception of the request or may include status information.

The event notifying unit 62 generates notification data including status information, and transmits the generated notification data to the presentation layer 40 through the interface 50 by using the WebSocket protocol.

In this exemplary embodiment, the function layer 60 and the presentation layer 40 transmit a request, a response, or a notification generally by four methods. The first and second methods use the HTTP protocol, and are executed by the receiving and responding unit 61. The third method uses both the HTTP protocol and the WebSocket protocol, and is cooperatively executed by the receiving and responding unit 61 and the event notifying unit 62. The fourth method transmits a notification by using the WebSocket Protocol, and is executed by the event notifying unit 62.

In the first method, when a processing request (HTTP request) is transmitted from the presentation layer 40, the receiving and responding unit 61 waits until execution of the processing is completed by the middleware layer 70 and the hardware layer 80. In this case, when completion of the processing is notified from the middleware layer 70, the receiving and responding unit 61 transmits a HTTP response including status information indicating a state at completion of the processing to the presentation layer 40 which has requested the processing. For example, when a user operates operation image data, such as "−" (A16) or "+" (A15) in the column of "magnification select" shown in FIG. 2, the presentation layer 40 requests processing of decreasing or increasing a parameter of copy magnification. In this case, the receiving and responding unit 61 transmits a response including the value of parameter changed as the result that the requested processing is executed, to the presentation layer 40.

In the second method, when a processing request (HTTP request) is received from the presentation layer 40, the receiving and responding unit 61 does not wait completion of the requested processing and transmits a response indicating reception of the processing request (HTTP response). Then, status information is acquired such that the presentation layer 40 executes so-called polling by using HTTP. That is, when a request for a notification about the status of the processing (hereinafter, referred to as "notification request") is made from the presentation layer 40, the receiving and responding unit 61 responds to the notification request. When the response is made by the second method, the sheet number information C11 shown in FIG. 3A is notified every polling instead of each time when a copied image is formed on a medium. Owing to this, for example, the number of pages may not be incremented by one, but may be incremented by several pages.

As described above, if one of the first and second methods is used, when a request (processing request or notification request) is made from the presentation layer 40, the receiving and responding unit 61 transmits a response to the request. If the first method is used, the receiving and responding unit 61 transmits the result of the processing to the presentation layer 40 of the request source in response to the processing request. In case the second method is used, the receiving and responding unit 61 transmits the result of the processing and the status of other processing to the presentation layer 40 of the request source in response to the notification request received after the response to the processing request.

In the third method, when a processing request (HTTP request) is received from the presentation layer 40, the receiving and responding unit 61 does not wait for completion of the requested processing and transmits a response indicating reception of the processing request (HTTP response) similarly to the second method. Then, if a status to be notified is generated in processing being executed by the middleware layer 70 and the hardware layer 80, the event notifying unit 62 transmits notification data serving as a message including status information indicating the status to the presentation layer 40 by using WebSocket even without a notification request. That is, the status to be notified by the third method is the status of processing to be executed in response to the processing request. When the notification is transmitted by the third method, the "number of pages" in the sheet number information C11 shown in FIG. 3A is incremented every time when a copied image is formed on a medium.

In the fourth method, if a status to be notified is generated, the event notifying unit 62 transmits notification data serving as a message including status information indicating the status even without a notification request to the presentation layer 40 by using WebSocket, regardless of presence of a processing request from the presentation layer 40. That is, the status to be notified by the fourth method does not relate to processing to be executed in response to a processing request. In the fourth method, for example, any presentation layer 40 may be possibly a notification target as long as the presentation layer 40 has a session established to the information processing apparatus 10 based on the standard of WebSocket. In the information processing system 1, a status, such as "out of toner," "out of paper," or "housing portion open (a state in which a housing portion that houses media such as paper is open)," is notified by the fourth method. The status to be notified by the fourth method may be different depending on the presentation layer 40 (the display device 4) being the notification target.

As described above, if one of the third and fourth methods is used, the event notifying unit 62 actively makes a (so-called push) notification regardless of presence of a request (processing request and notification request) from the presentation layer 40. When the third method is used, the event notifying unit 62 makes a notification about the result of the processing and the status of other processing after the response to the processing request. If the fourth method is used, the event notifying unit 62 makes a notification about the state of predetermined processing.

If one of the second and third methods is used, the receiving and responding unit 61 or the event notifying unit 62 transmits the result of the processing and the status of other processing after the response to the processing request. Also, any of the first to third methods is a method for making a notification about the status of requested processing. In this exemplary embodiment, the presentation layer 40 designates a method (that is, one of the first to third methods) of transmitting the status of the processing (including the result of the processing) when requesting the processing. For example, the transmission method may be designated by a parameter included in a processing request generated by the device controller 42. The receiving and responding unit 61 and the event notifying unit 62 transmit a response and/or a notification by using a method designated by the presentation layer 40.

In this exemplary embodiment, status information is generated by the middleware layer 70, and is supplied to the receiving and responding unit 61 or the event notifying unit 62. Alternatively, the status information may be generated by the function unit 65, the receiving and responding unit 61, or the event notifying unit 62. Still alternatively, the status information to be supplied to the event notifying unit 62 may be supplied to the event notifying unit 62 through the receiving and responding unit 61, instead of being directly supplied from the middleware layer 70 (or the function unit 65) to the event notifying unit 62.

The operation image managing unit 63 manages operation image data to be transmitted to the presentation layer 40. The operation image DB 64 is a database that stores operation image data. The operation image managing unit 63 provides the above-described operation image data to the presentation layer 40 through the interface 50. The operation image managing unit 63 stores operation image data (image data indicating an operation image and is a file described in, for example, the HTML form), and when a request for operation image data is transmitted through the interface 50, the operation image managing unit 63 transmits a response including the operation image data to the request source through the interface 50.

When a request for operation image data is transmitted from the user device 20, the operation image managing unit 63 transmits the operation image data to the user device 20 in response to the request. Also, when a request for operation image data is transmitted from the operation device 30, the operation image managing unit 63 transmits the operation image data to the operation device 30 in response to the request. By transmitting the operation image data to the request sources (the user device 20 and the operation device 30) of the operation image data in this way, the operation image managing unit 63 provides operation image data to each of the request sources.

The function unit 65 is a module group for realizing a function to be provided to the user by the information processing apparatus 10. When a processing request is transmitted from the presentation layer 40 through the interface 50, the function unit 65 of the information processing apparatus 10 controls the middleware layer 70 to execute processing requested by the processing request.

Figure 9:
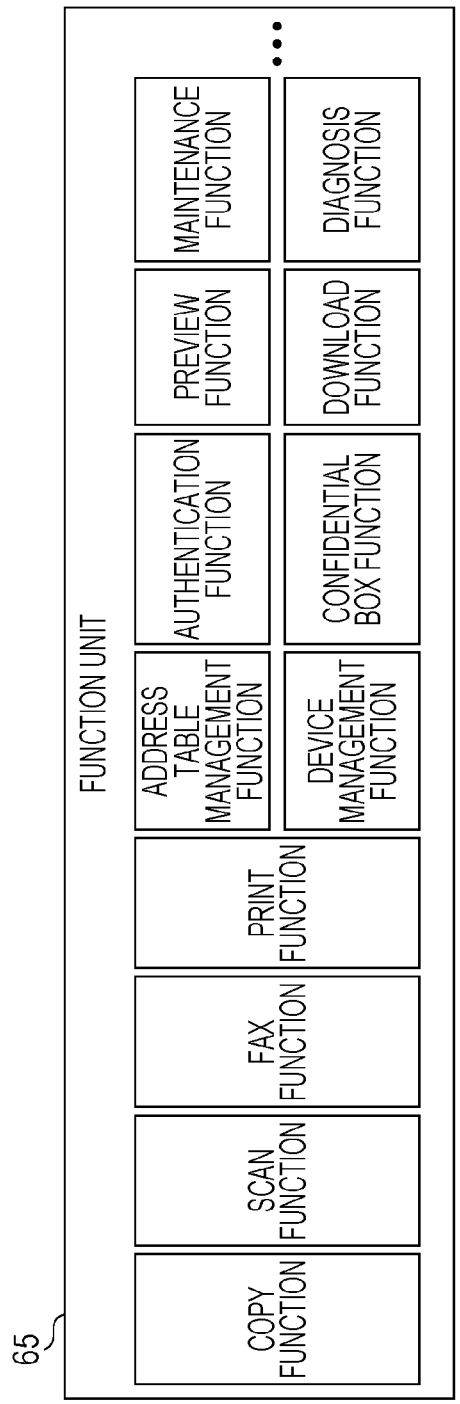
FIG. 9 is an illustration showing an example of a module group included in a function unit.

FIG. 9 is an illustration showing an example of a module group included in the function unit 65. The function unit 65 includes modules for respectively realizing a copy function, a scan function, a FAX function, a print function, an address table management function (a function of managing address information), a device management function (a function of managing a document set state of the image reading unit 13, states of media and consumables of the image forming unit 14, etc.), an authentication function, a confidential box function (a function of managing an electronic document stored in the information processing apparatus 10), a preview function, a download function (a function of controlling update of a program), a maintenance function (a function of maintenance for hardware in response to a request from a remote), and a diagnosis function (a function of diagnosis for hardware).

For example, the function unit 65 analyses instruction data included in a processing request, and controls the middleware layer 70 so as to execute processing in accordance with the content of the analyzed instruction. To be specific, the function unit 65 executes instructed processing (for example, copy processing) in accordance with an instructed parameter. Accordingly, the middleware layer 70 reads an image from a medium with an image quality and a reading method determined by operations of the user, and forms the read image in an output format, with a magnification, on a sheet of paper, in a color mode determined by operations of the user.

The function unit 65 supplies the transaction ID supplied from the receiving and responding unit 61 to the middleware layer 70 when instructing the middleware layer 70 to execute the processing. The middleware layer 70 supplies the transaction ID together with the above-described status information to the receiving and responding unit 61.

Also, the function unit 65 analyzes a description that designates a method described in a processing request (one of the first to third methods), and transmits the analyzed method (that is, the method designated by the display device 4) to the receiving and responding unit 61. The receiving and responding unit 61 or the event notifying unit 62 transmits notification data describing the status information supplied with the transaction ID to the target address of communication associated with the transaction ID supplied from the function unit 65, by the transmitted method. Accordingly, the receiving and responding unit 61 or the event notifying unit 62 transmits the status of processing to the request source of the processing by the designated method. Alternatively, the function unit 65 may only supply a processing request to the receiving and responding unit 61, and the receiving and responding unit 61 may analyze the designated notification target.

The middleware layer 70 is a layer that executes general-purpose processing at an intermediate position between the function layer 60 and the hardware layer 80. The hardware layer 80 is a layer that physically realizes processing such as image reading or image formation. The middleware layer 70 and the hardware layer 80 execute various processing such as scan processing, FAX processing, and print processing (processing for respectively providing the scan function, FAX function, and print function) in addition to the above-described copy processing. The copy processing includes image reading processing by the image reading unit 13 and image forming processing by the image forming unit 14 shown in FIG. 6. The scan processing includes the image reading processing. Also, the print processing includes communication processing by the first communication unit 15 and the image forming processing. The scan processing includes, for example, data communication processing using the second communication unit 16, writing processing of writing data in the memory 12, and reading processing of reading stored data from the memory 12. When the middleware layer 70 and the hardware layer 80 execute processing, the middleware layer 70 and the hardware layer 80 supply the above-described status information (information indicating the state of processing being executed) to the function layer 60.

At least one of the receiving and responding unit 61, the event notifying unit 62, the operation image managing unit 63, and the function unit 65 shown in FIG. 8 is an example of the first receiving unit 101, the transmitting unit 102, the second receiving unit 103, the establishing unit 104, and the disconnecting unit 105 shown in FIG. 7. At least one of the UI controller 41, the device controller 42, and the communication unit 43 is an example of the acquiring unit 401, the first transmitting unit 402, the receiving unit 403, the second transmitting unit 404, and the third transmitting unit 405.

1-5. Operation
1-5-1. Transmission Operation of Status Information
Examples of operations executed by the device and apparatus when status information is transmitted by the first to fourth methods are described first with reference to FIGS. 12 to 15.

Figure 12:
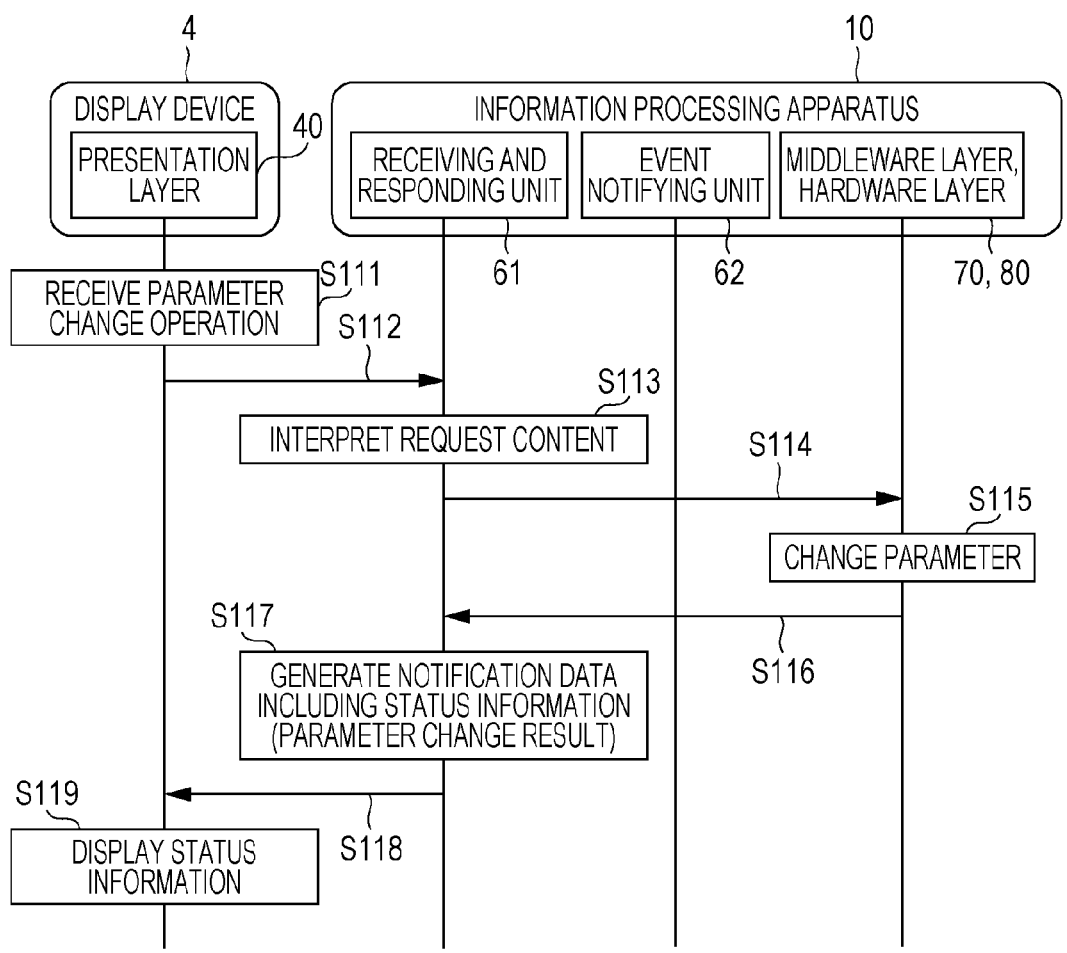
FIG. 12 is a sequence diagram showing an example operation of the device and apparatus when a first method is used.

1-5-1-1. First Transmission Operation of Status Information
FIG. 12 is a sequence diagram showing an example operation of the device and apparatus when the above-described first method is used as a transmission method of status information. The operation shown in FIG. 12 is started, for example, by a trigger that the user executes an operation of changing parameters (magnification, paper size, color mode, etc.) for copy before the user executes copy. First, when the controller 141 (the presentation layer 40) of the display device 4 receives the operation of changing the parameters (step S111), the controller 141 transmits instruction data describing a request for parameter change, in a manner included in a HTTP request, to the information processing apparatus 10 (step S112). When the receiving and responding unit 61 of the information processing apparatus 10 receives the HTTP request, the receiving and responding unit 61 interprets the content of the received request (step S113), and instructs the middleware layer 70 of the information processing apparatus 10 about execution of processing in accordance with the interpreted content (step S114).

The middleware layer 70 executes the instructed processing, that is, the parameter change in cooperation with the hardware layer 80 (step S115), and supplies information indicating the result as status information to the receiving and responding unit 61 (S116). The receiving and responding unit 61 generates notification data describing the supplied status information (in this example, parameter change result) (step S117). The receiving and responding unit 61 transmits a HTTP response including the generated notification data to the display device 4 being the request source of the processing (step S118). The controller 141 of the display device 4 causes the display 144 of the display device 4 to display the status information included in the transmitted HTTP response (step S119).

1-5-1-2. Second Transmission Operation of Status Information

Figure 13:
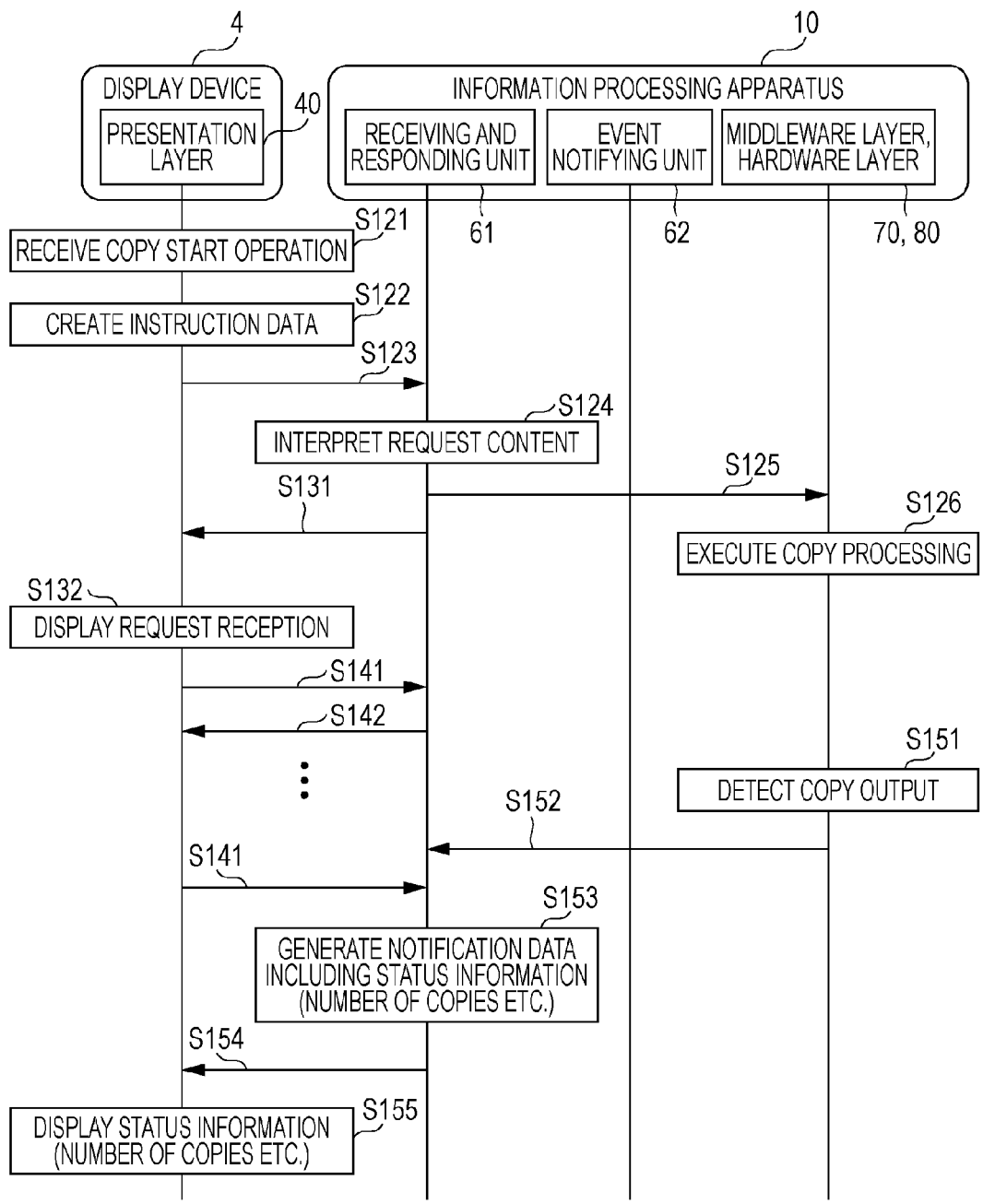
FIG. 13 is a sequence diagram showing an example operation of the device and apparatus when a second method is used.

FIG. 13 is a sequence diagram showing an example operation of the device and apparatus when the second method is used. The operation shown in FIG. 13 is started, for example, by a trigger that the user sets a document on the image reading unit 13 of the information processing apparatus 10 and executes an operation to start copy with respect to the display device 4. First, when the controller 141 of the display device 4 receives the operation to start copy (step S121), the controller 141 creates instruction data corresponding to the received operation (step S122). The controller 141 transmits a processing request including the created instruction data (HTTP request) to the information processing apparatus 10 (step S123). When the receiving and responding unit 61 of the information processing apparatus 10 receives the processing request through the interface 50 shown in FIG. 8, the receiving and responding unit 61 analyzes the instruction data included in the received processing request and hence interprets the content of the instruction (step S124).

When the receiving and responding unit 61 instructs the middleware layer 70 to execute the copy processing based on the interpreted content (step S125), the middleware layer 70 and the hardware layer 80 cooperatively execute the processing based on the instructed content (copy processing) (step S126). The receiving and responding unit 61 transmits a HTTP response indicating reception of the request for the copy processing after the instruction for the copy processing, to the display device 4 as a response to the HTTP request received in step S123 (step S131). The controller 141 of the display device 4 causes the display 144 of the display device 4 to display the content in accordance with the received HTTP response (step S132). Alternatively, the operation in step S131 may be executed before the operation in step S124 or S125.

In the second method, a notification of processing status and a notification of processing completion in response to a processing request from the display device 4 are acquired by the display device 4 such that the display device 4 executes polling processing in response to the HTTP request. The controller 141 of the display device 4 executes the polling processing by transmitting a notification request (HTTP request) for requesting a notification of the status of the copy processing after the controller 141 receives the response to the request for the copy processing (S141). If status information of the copy processing is not supplied yet, the receiving and responding unit 61 of the information processing apparatus 10 transmits a HTTP response indicating the situation to the display device 4 (step S142). Operations in step S141 and S142 are repeated.

When a copy (an image indicating a read document) is output to a medium, the middleware layer 70 of the information processing apparatus 10 detects the output (step S151), and supplies status information indicating a status in which the copy is output to the medium to the receiving and responding unit 61 (step S152). When the receiving and responding unit 61 receives a notification request (HTTP request) after the status information is supplied (step S141), the receiving and responding unit 61 generates notification data including the status information (step S153), and transmits the notification data, in a manner included in the HTTP response, to the display device 4 (step S154). The controller 141 of the display device 4 causes the display 144 of the display device 4 to display the content corresponding to the notification data (step S155) similarly to step S132.

1-5-1-3. Third Transmission Operation of Status Information

Figure 14:
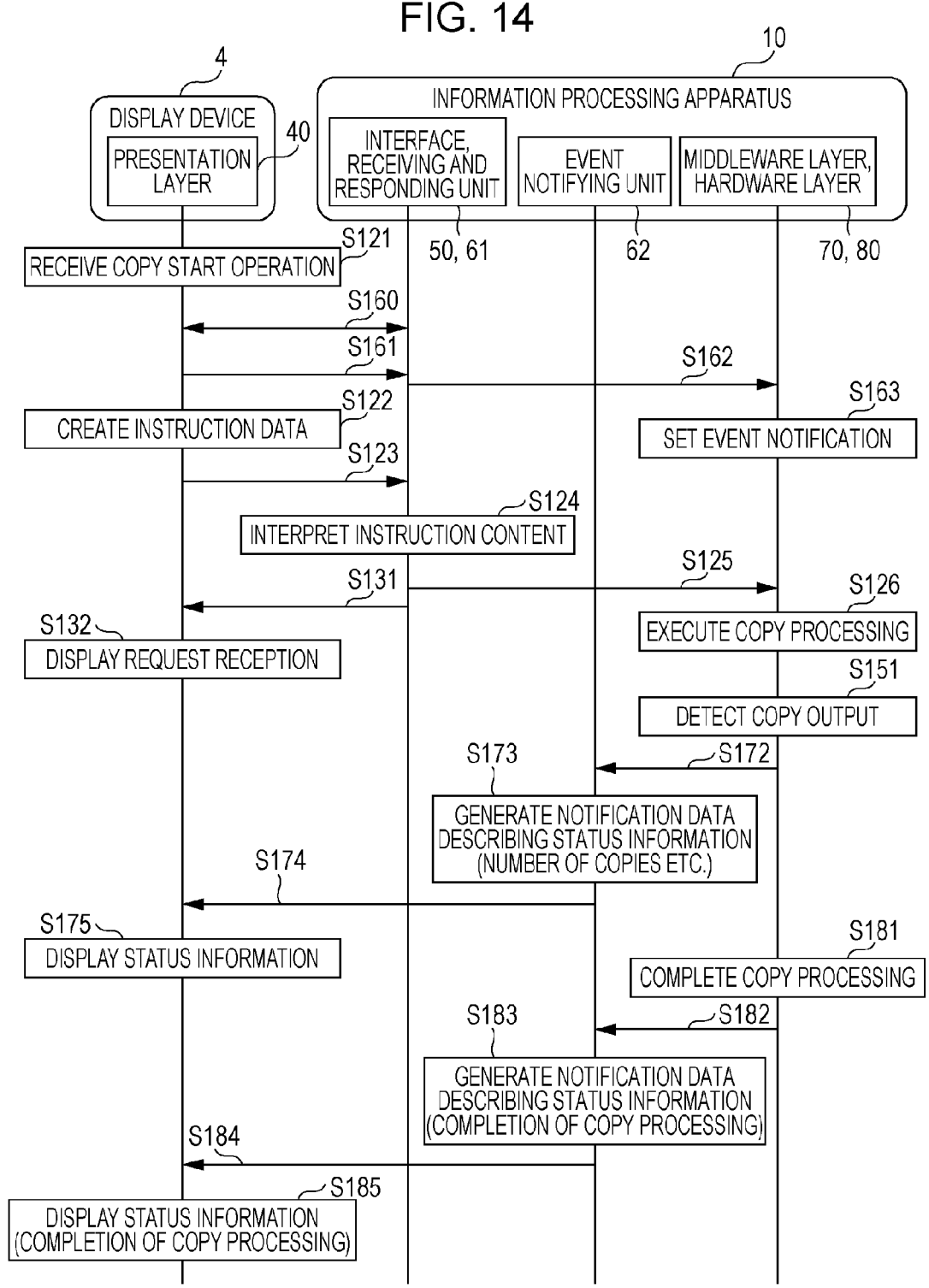
FIG. 14 is a sequence diagram showing an example operation of the device and apparatus when a third method is used.

FIG. 14 is a sequence diagram showing an example operation of the device and apparatus when the third method is used. In the first method and the second method, data is exchanged between the display device 4 and the information processing apparatus 10 by using HTTP. In contrast, in the third method, data is transmitted from the information processing apparatus 10 to the display device 4 by using the WebSocket protocol in addition to HTTP. To be specific, status information acquired by polling in the second method is notified to the display device 4 as a message of WebSocket in the third method. The second method and the third method realize single processing by different methods, and hence are selectively used.

The operation shown in FIG. 14 is started by a trigger that the user executes an operation to start copy similarly to FIG. 13. First, when the controller 141 of the display device 4 receives the operation to start copy (step S121), the controller 141 executes processing for establishing a WebSocket session with respect to the information processing apparatus 10. That is, the controller 141 transmits a HTTP request being a handshake request of WebSocket to the information processing apparatus 10. The HTTP request includes a client ID for identifying the display device 4.

The interface 50 of the information processing apparatus 10 executes switching to WebSocket in response to the HTTP request received from the display device 4. The receiving and responding unit 61 transmits a handshake response of WebSocket to the display device 4, and accordingly, the WebSocket session (hereinafter, merely referred to as "session") is established between the display device 4 and the information processing apparatus 10 (step S160). The timing at which the session is established is not limited to the above-described timing. For example, the session establishing processing may be executed at a timing when the user starts up a web browser by using the display device 4 and executes an operation of making an access to the URL (Uniform Resource Locator) of the information processing apparatus 10.

Also, the receiving and responding unit 61 stores the client ID included in the received HTTP request in a predetermined region of the memory 12 (hereinafter, referred to as "cache region 12a," not illustrated). The client ID stored in the cache region 12a remains for a predetermined term and then is deleted if it is detected that the session is disconnected by normal processing. That is, the cache region 12a stores a client ID of a display device 4 in the middle of establishment of a session with respect to the information processing apparatus 10, and a client ID of a display device 4 whose session is disconnected in the middle of processing.

In processing of step S161 and later, the display device 4 and the information processing apparatus 10 exchange a message by using the protocol of HTTP or WebSocket. In the following description, a message transmitted and received by using HTTP and a message transmitted and received by using WebSocket are merely collectively referred to as "message" unless otherwise these messages have to be distinguished from one another. The receiving and responding unit 61 of the information processing apparatus 10 stores the message transmitted by the information processing apparatus 10 in the cache region 12a together with the client ID, transaction ID, and sequence ID applied to the message. The sequence ID is identification information for identifying the message. Also, the controller 141 of the display device 4 stores a pair of the transaction ID and the sequence ID applied to the message received by the display device 4 in a cache region (hereinafter, referred to as "cache region 142a," not illustrated) of the display device 4. The cache region 142a may be included in the memory 142, or may be provided in the RAM. The set of IDs stored in the cache region 142a is referenced if the session is disconnected in the middle of processing.

The description returns to FIG. 14. When the WebSocket session is established, the controller 141 transmits a HTTP request including data describing that the above-described third method is requested to the information processing apparatus 10 (step S161). When the receiving and responding unit 61 of the information processing apparatus 10 receives the HTTP request, the receiving and responding unit 61 transmits the content of the request described in the data included in the received HTTP request to the middleware layer 70 (step S162). The middleware layer 70 receives the transmitted request and executes setting for transmission of state information by hereinafter using the third method with respect to the display device 4 (step S163). For example, the middleware layer 70 changes a flag indicating whether or not a notification is made by the third method to ON.

The operation from step S122 to step S126 and the operation in step S131 and step S132 shown in FIG. 13 are executed. Then, when the middleware layer 70 and the hardware layer 80 of the information processing apparatus 10 execute the operation in step S151 (detection of copy output), since the flag is ON, the middleware layer 70 and the hardware layer 80 supply status information indicating that a copy is output to a medium to the event notifying unit 62 instead of the receiving and responding unit 61 (step S172). The event notifying unit 62 generates notification data describing the supplied status information (the number of copies etc.) (step S173), and transmits the generated data to the display device 4 through the WebSocket session established in step S160 (step S174). The controller 141 of the display device 4 causes the display 144 of the display device 4 to display the content described in the received data (for example, status information C1 shown in FIG. 3A) (step S175).

When the middleware layer 70 and the hardware layer 80 complete the copy processing (step S181), the middleware layer 70 and the hardware layer 80 supply status information indicating the completion to the event notifying unit 62 (step S182). The event notifying unit 62 generates notification data describing the status information (for example, notification data including a character string of "copy is completed") (step S183), and transmits the generated notification data to the display device 4, in a manner included in a message of WebSocket (step S184). The controller 141 of the display device 4 causes the display 144 of the display device 4 to display the content described in the notification data received in step S184 (for example, status information C2 shown in FIG. 7B) (step S185).

1-5-1-4. Fourth Transmission Operation of Status Information

Figure 15:
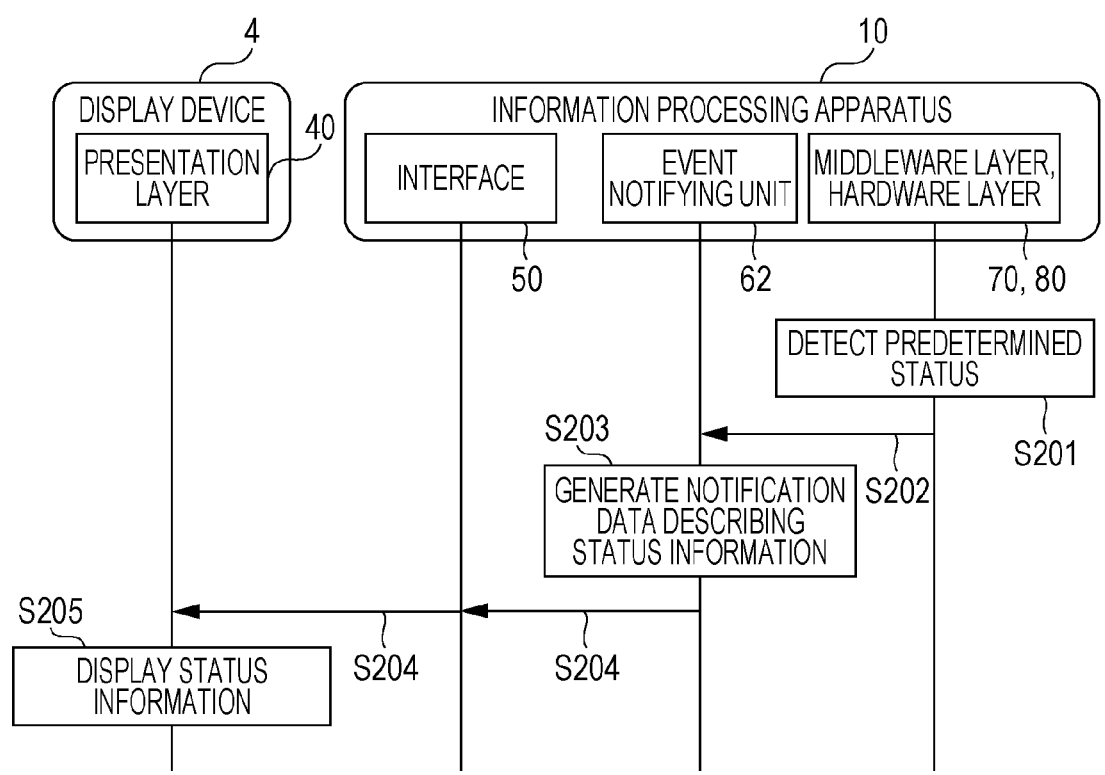
FIG. 15 is a sequence diagram showing an example operation of the device and apparatus when a fourth method is used.

FIG. 15 is a sequence diagram showing an example operation of the device and apparatus when the fourth method is used. In the fourth method, the display device 4 is notified of status information by using WebSocket. In this method, a previously established WebSocket session, for example, the session established in step S160 in FIG. 14 is used. If a predetermined status occurs in the information processing apparatus 10 (out of toner, out of paper, housing portion open, etc.), the middleware layer 70 and the hardware layer 80 of the information processing apparatus 10 cooperatively detect the predetermined status (step S201), and supply status information indicating the detected status to the event notifying unit 62 (step S202). The event notifying unit 62 generates notification data describing the supplied status information (step S203), and transmits the generated notification data to the display device 4 through the interface 50 by using the established WebSocket session (step S204). The controller 141 of the display device 4 causes the display 144 of the display device 4 to display the status information described in the notification data received in step S204 (step S205).

Alternatively, as described above, a status different depending on the display device 4 may be notified. In this case, before step S201, the controller 141 transmits notification data describing a state to be notified to the display device 4 to the information processing apparatus 10 through the communication unit 43. The event notifying unit 62, which has received the notification data through the interface 50, stores the status to be notified in association with the target address of the display device 4. If status information supplied in step S202 represents the stored status to be notified, the event notifying unit 62 makes a notification about the status.

1-5-2. Operation Example 1

Figure 16:
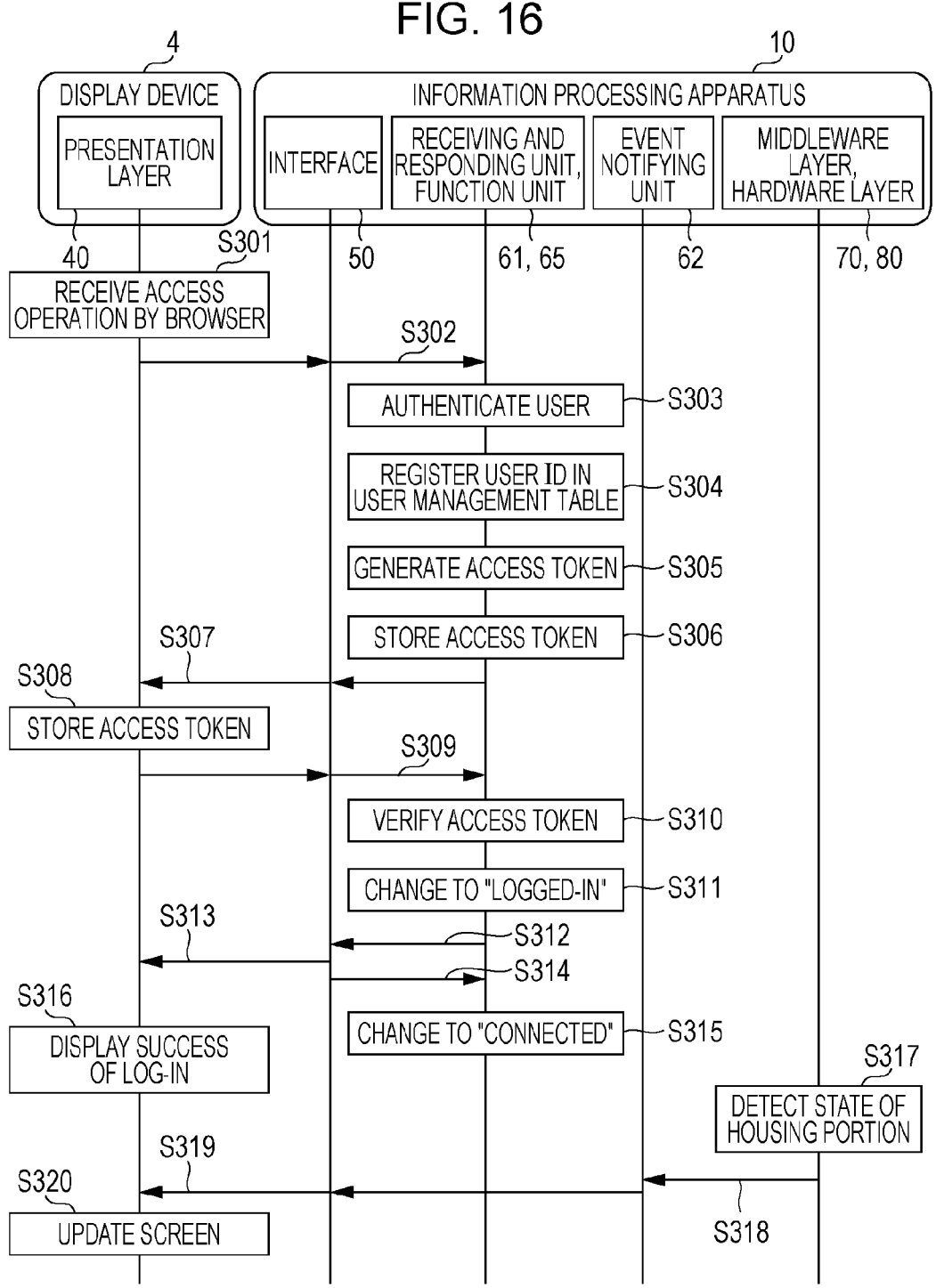
FIG. 16 is a sequence diagram showing an example of a log-in operation.

FIG. 16 is a sequence diagram showing a specific operation example of the information processing system 1. Described in this example is an example of a series of operations operated by a user U1 using the display device 4, the operations in which authentication information for using various functions provided by the information processing apparatus 10 is input and the display device 4 logs in the information processing apparatus 10. In this operation example, TCP and HTTP (an example of a first communication protocol), and TCP and WebSocket (an example of a second communication protocol) are used as communication protocols for exchanging data between the display device 4 and the information processing apparatus 10. Also, in this example, user authentication is executed by Basic authentication of HTTP.

First, the user U1 executes an operation on the display device 4 to start up a web browser and make an access to the URL of the information processing apparatus 10. At this time, the user U1 inputs user account information (an example of authentication information) used for log-in to the information processing apparatus 10 by using the operation unit 145 of the display device 4. In this example, a user ID and a password are used as the account information. The user ID is identification information allocated to each user.

In step S301, the controller 141 of the display device 4 starts up a web browser. In step S302, the controller 141 establishes TCP (Transmission Control Protocol) connection (an example of a first communication path) to the information processing apparatus 10, and transmits a HTTP request (authentication request) including the input account information to the information processing apparatus 10 through the established TCP connection.

The receiving and responding unit 61 receives the HTTP request transmitted from the display device 4. The receiving and responding unit 61 supplies the account information included in the HTTP request to the function unit 65. In step S303, the function unit 65 executes user authentication based on whether or not the supplied account information is stored in the authentication database (not shown) stored in the memory 12. If the account information supplied to the function unit 65 is stored in the authentication database, the user authentication is successful. In contrast, if the account information is not stored in the authentication database, the user authentication is failed. FIG. 16 shows a case in which the account information of the user U1 is registered in the authentication database. Since the account information of the user U1 is registered in the authentication database, the user authentication is successful.

If the user authentication is successful, in step S304, the function unit 65 registers the user ID of the user U1 succeeded in the user authentication in a user management table 121 of the memory 12 (see FIG. 6) (step S304). The user management table 121 is a table for managing the log-in state and connection state of the user.

FIG. 17 is an illustration showing an example of a content of the user management table 121. In the user management table 121, as illustrated, respective items of "user ID," "access token," "log-in state," and "connection state" are associated with each other. Among these items, "user ID" is identification information for identifying a user. "Access token" is information for permitting an access used for opening a session of WebSocket. An access token is generated by the function unit 65 if Basic authentication of HTTP is successful. "Log-in state" is information indicating the log-in state of the user ID to the information processing apparatus 10, and a value of "logged-in" or "logged-off" is set. "Connection state" is information indicating the connection state of the WebSocket session, and a value of "connected" or "disconnected" is set.

The description returns to FIG. 16. In step S305, the function unit 65 generates an access token used for establishing the session of WebSocket. In this access token, a term of validity (for example, three minutes since an access token is generated) is set. In step S306, the function unit 65 registers the generated access token in the user management table 121 in association with the user ID of the user U1. Also, the function unit 65 supplies the generated access token to the receiving and responding unit 61. The function unit 65 issues a timer corresponding to the term of validity set by the access token at a timing when the function unit 65 supplies the access token. The access token registered in the user management table 121 becomes invalid if an establishment request for a session including the access token is not received from the display device 4 before the timeout of the timer, and the access token is deleted from the user management table 121. In contrast, if an establishment request for the session including the access token is received from the display device 4 before the timeout of the timer, the access token is kept valid without being deleted from the user management table 121. In this case, the access token stored in the user management table 121 is referenced if the session is disconnected and re-connection processing is executed.

In step S307, the receiving and responding unit 61 generates a HTTP response including information indicating the access token and the result of the user authentication supplied from the function unit 65, and transmits the generated HTTP response to the display device 4 through the interface 50.

If the controller 141 of the display device 4 receives the HTTP response indicating success of the user authentication, the process goes to step S308. In contrast, if the controller 141 receives the authentication result indicating failure of the user authentication, subsequent processing is not executed and the processing is ended. In this example, the display device 4 receives the HTTP response indicating success of the user authentication, and the process goes to step S308. In step S308, the controller 141 stores the access token included in the received HTTP response in a predetermined cache region (hereinafter, referred to as "cache region 142a") of the memory 142 or the RAM. In step S309, the controller 141 establishes TCP connection to the information processing apparatus 10 being the transmission source of the access token, and transmits a HTTP request being a handshake request of WebSocket through the TCP connection. The HTTP request includes the access token received in step S307.

The receiving and responding unit 61 receives the handshake request from the display device 4. The receiving and responding unit 61 specifies whether the received handshake request includes the access token. If the access token is included, the receiving and responding unit 61 supplies the access token to the function unit 65. In step S310, if the access token is supplied from the receiving and responding unit 61, the function unit 65 verifies whether the supplied access token is registered in the user management table 121. If the access token is stored in the user management table 121, log-in by the user U1 is successful. In contrast, if the access token is not stored in the user management table 121, log-in by the user U1 is failed. In this example, since the supplied access token is registered in the user management table 121, log-in is successful. In step S311, the function unit 65 changes the value of "log-in state" corresponding to the user ID of the user U1 to the value indicating "logged-in" in the user management table 121. In step S312, the function unit 65 notifies the interface 50 about that the verification of the access token is successful.

If the interface 50 is notified about that the verification of the access token is successful from the function unit 65, the process goes to processing in step S313 and later. In contrast, if a notification about that the verification of the access token is failed, the interface 50 does not execute subsequent processing, and responds to the display device 4 about the failure of log-in. In this exemplary embodiment, the interface 50 is notified about that the verification of the access token is successful, and the process goes to step S313. In step S313, the interface 50 executes switching to WebSocket in response to the HTTP request received from the display device 4 in step S309. The interface 50 executes a handshake response of WebSocket, and accordingly, a session of WebSocket (an example of a second communication path) is established between the display device 4 and the information processing apparatus 10.

When the session is established, in step S314, the success in establishment of the session is notified from the interface 50 to the function unit 65 through the receiving and responding unit 61. In step S315, the function unit 65 changes the value of "connection state" corresponding to the user ID of the user U1 to the value indicating "connected" in the user management table 121.

In step S316, the controller 141 displays success in log-in to the information processing apparatus 10 on the display 144.

In this exemplary embodiment, as described above, as the communication path for exchange of data between the display device 4 and the information processing apparatus 10, the communication path using HTTP on the TCP connection (an example of a first communication path) and the WebSocket session on the TCP connection (an example of a second communication path) are both used. In the following description, for the convenience of description, the communication path using HTTP on the TCP connection is referred to as "first channel," and the WebSocket session is referred to as "second channel."

By the processing to step S316, log-in processing using the display device 4 is executed. When the log-in processing is ended, the user U1 executes an operation for using various functions provided by the information processing apparatus 10 by using the display device 4. The information processing apparatus 10 executes various processing in accordance with a processing request transmitted from the display device 4. For example, if the copy processing is instructed by the user U1, the copy function is provided by executing the above-described series of processing shown in FIG. 13, or executing a series of processing excluding the processing in step S160 shown in FIG. 14 (the establishment processing of the WebSocket session). Also, for example, if parameter change relating to the copy processing is instructed, a parameter change function is provided by executing the above-described series of processing shown in FIG. 12. Also, for example, if the housing portion of media is opened while being logged-in, the user U1 is notified about that the housing portion of paper is not set by executing the above-described series of processing shown in FIG. 15.

After the processing in step S316, if the series of processing shown in FIG. 12 or the series of processing shown in FIG. 13 is executed, data is exchanged through the first channel. In contrast, if the processing shown in FIG. 14 is executed, the first channel and the second channel (that is, the WebSocket session established in step S309 to step S313) both are used. Also, the series of processing shown in FIG. 16 executes transmission of a message through the second channel (that is, the WebSocket session established in step S309 to step S313).

FIG. 16 shows an operation when the housing portion housing media is opened by the user U1 after the processing in step S316. If the housing portion housing media is opened by the user U1, in step S317, the middleware layer 70 detects that the housing portion is not set in response to a notification from the hardware layer 80. In step S318, the middleware layer 70 supplies state information indicating the detected state to the event notifying unit 62. In step S319, the event notifying unit 62 transmits a message of WebSocket including the supplied state information to the display device 4 through the second channel. In step S320, the controller 141 displays a screen corresponding to the received state information (screen exemplified in FIG. 10).

1-5-3. Operation Example 2

Figure 18:
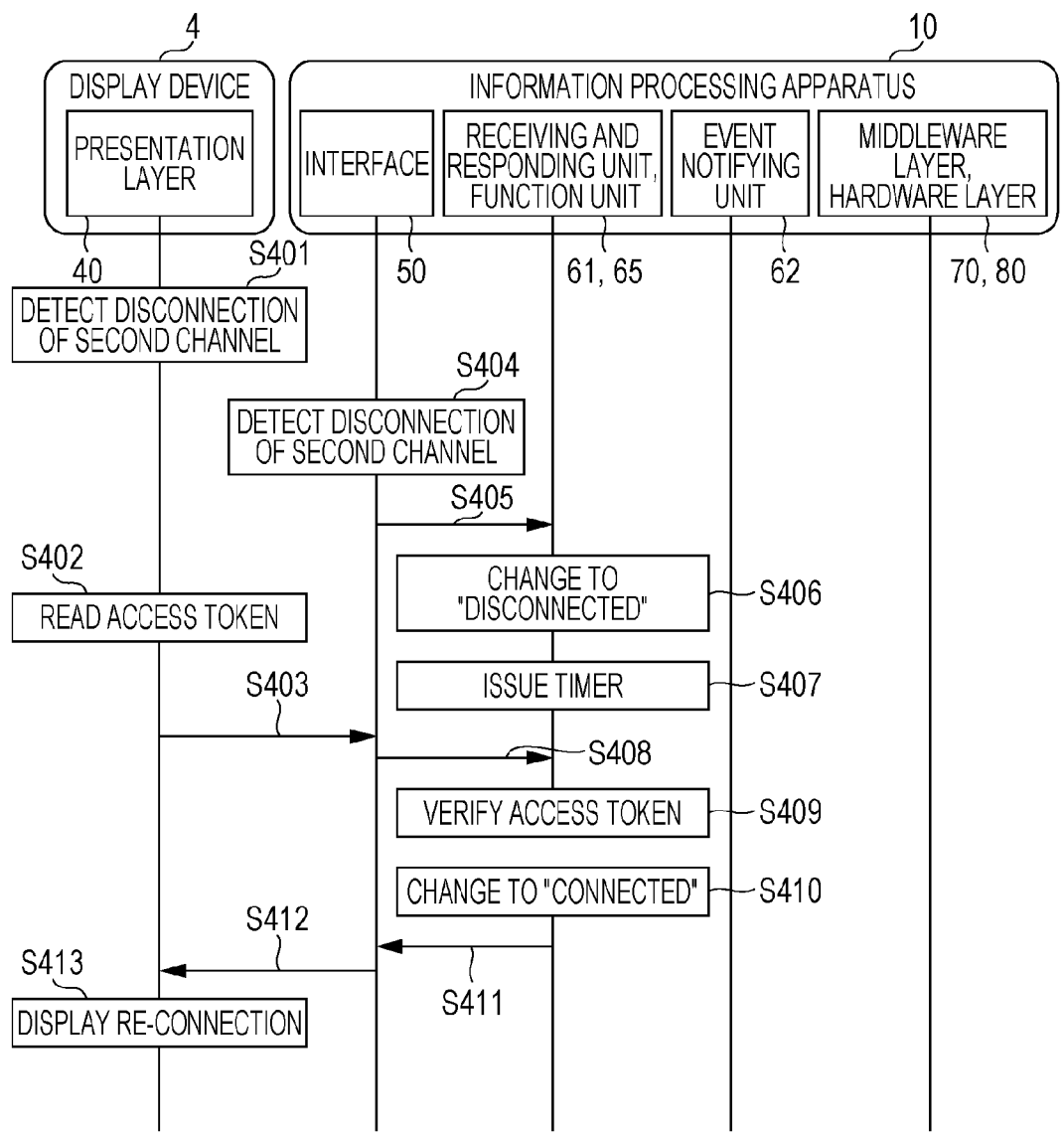
FIG. 18 is a sequence diagram showing an example of a re-connection operation of a second channel.

FIG. 18 is a sequence diagram showing a flow of re-connection processing of the second channel if the second channel is disconnected. While the user U1 is logged in the information processing apparatus 10, the second channel may be disconnected by some reasons. Disconnection of the second channel may be, for example, an unstable communication state of a network, or disconnection due to a power failure or power saving. In this case, according to this exemplary embodiment, the second channel is re-connected by executing processing shown in FIG. 18.

In step S401, the controller 141 detects disconnection of the second channel. When the disconnection of the second channel is detected, in step S402, the controller 141 reads an access token stored in the cache region 142*a*. In step S403, the controller 141 establishes again TCP connection, and transmits a handshake request of WebSocket through the established TCP connection. The handshake request includes the access token read in step S402.

Also, the interface 50 of the information processing apparatus 10 also detects disconnection of the second channel in step S404. In step S405, the interface 50 notifies the function unit 65 about that the disconnection of the second channel is detected. In step S406, the function unit 65 changes the value of "connection state" in the user management table 121 corresponding to the disconnected second channel to the value indicating "disconnected." Also, in step S407, the function unit 65 issues a timer corresponding to a term of validity of an access token corresponding to the disconnected second channel. The access token registered in the user management table 121 becomes invalid if an establishment request for the second channel including the access token (handshake request of WebSocket) is not received from the display device 4 before the timeout of the issued timer. If the access token becomes invalid, information relating to the user corresponding to the timeout access token (user ID, access token, etc.) is deleted from the user management table 121. In contrast, if an establishment request for the second channel including the access token is received from the display device 4 before the timeout of the issued timer, the access token is kept valid without being deleted from the user management table 121.

In step S408, the interface 50 receives the handshake request transmitted in step S403, and supplies the access token included in the received request to the function unit 65. FIG. 18 shows an operation if the handshake request transmitted in step S403 is supplied to the function unit 65 before the timeout of the timer issued in step S407. In step S409, the function unit 65 verifies whether the supplied access token is registered in the user management table 121. If the supplied access token is stored in the user management table 121, authentication is successful. In contrast, if the supplied access token is not stored in the user management table 121, authentication is failed. In this example, since the supplied access token is registered in the user management table 121, authentication is successful. In step S410, the function unit 65 changes the value of "connection state" corresponding to the supplied access token to the value indicating "connected" in the user management table 121. In step S411, the function unit 65 notifies the interface 50 about that the verification of the access token is successful.

In step S412, the interface 50 executes a handshake response to the handshake request received from the display device 4 in step S403. Accordingly, the second channel is established again between the display device 4 and the information processing apparatus 10. In step S413, the controller 141 causes the display 144 to display that the second channel is re-connected.

Meanwhile, in software using plural communication protocols, if authentication information is required for each of the communication protocols, input of authentication information corresponding to each of the communication protocols by the user may be troublesome work. In contrast, according to this exemplary embodiment, if user authentication of a first communication protocol (HTTP) by the information processing apparatus 10 is successful, an access token is transmitted through a communication path of the first communication protocol, and the access token is used as authentication information for communication according to other communication protocol (WebSocket). Accordingly, an operation load relating to user authentication is reduced in a system using plural communication protocols.

2. Modifications

The above-described exemplary embodiment is merely an example of implementation of the present invention, and may be modified as follows. Also, the above-described exemplary embodiment and respective modifications described below may be combined and implemented as required.

2-1. Transmission 1 of Acquisition Request for Access Token

In the above-described exemplary embodiment, the controller 141 stores the access token received from the information processing apparatus 10 in a cache region 121a (not illustrated) as shown in step S306 in FIG. 16. However, the access token does not have to be cached. If the access token is not cached, when the re-connection processing of the second channel is executed, the controller 141 transmits the acquisition request for the access token to the information processing apparatus 10 through the first channel instead of executing the processing shown in step S402 and step S403 in FIG. 18 in the above-described exemplary embodiment. That is, the controller 141 transmits the acquisition request for the access token to the information processing apparatus 10 through the first channel permitted for communication after the second channel is disconnected.

In this case, when the function unit 65 receives the acquisition request through the interface 50, the function unit 65 generates again an access token, and transmits the generated access token to the display device 4 through the first channel permitted for communication. In this example, since the access token is issued again, reliability of security is higher than a case in which the cached access token is re-used.

2-2. Transmission 2 of Acquisition Request for Access Token

In the above-described exemplary embodiment, if it is determined that the term of validity of the access token included in the re-connection request for the second channel transmitted by the controller 141 in step S403 in FIG. 18 is ended, the function unit 65 transmits a response indicating that situation to the display device 4. If the controller 141 receives the response indicating that the access token is invalid from the information processing apparatus 10, the controller 141 may transmit an acquisition request for an access token for opening the second channel, through the first channel permitted for communication.

2-3. Processing if Second Channel is Disconnected

In the above-described exemplary embodiment, as shown in FIG. 18, when the function unit 65 detects disconnection of the second channel, the function unit 65 issues a timer and waits for reception of a re-connection request for the second channel from the display device 4 until the timeout of the timer. The processing executed by the function unit 65 if the second channel is disconnected is not limited to this processing. For example, if the second channel is disconnected, the function unit 65 may disconnect the first channel to software to which the disconnected second channel has been established. In this case, the establishment processing of the first channel and the second channel has to be executed again. Hence, reliability of security is higher than a case in which the first channel is continuously used without disconnection.

2-4. Term of Validity of Access Token

In the above-described exemplary embodiment, the function unit 65 sets the term of validity for the access token; however, the term of validity does not have to be set for the access token. Also, the function unit 65 may issue an access token in which a different term of validity is set, depending on the type of display device 4 that executes authentication and makes an access request, or depending on the type of processing request transmitted together with the authentication and the access request. For example, for a request from the operation device 30 being a local UI unit, since the request is less likely a request from a malicious user or client device, the term of validity is set relatively long. Also, in a case of a request from an external device such as the user device 20 being a remote UI unit, since the request is more likely a request from a malicious user or client device, an access token may be issued while the term of validity is set relatively short.

2-5. Processing if Asynchronous Channel is not Opened

In the above-described exemplary embodiment, if an asynchronous channel may not be opened, the controller 141 may execute active switching to polling processing (processing using the above-described second method). In this case, the controller 141 may check the net status by polling, and if it is determined that the asynchronous channel is able to be opened, the asynchronous channel may be opened, and the processing execution method may be switched from the second method to the third method.

2-6. User Management Table

In the above-described exemplary embodiment, the user management table exemplarily shown in FIG. 17 is used; however the content of the user management table is not limited thereto. The user management table may store information other than the information shown in FIG. 17. Also, in the example in FIG. 17, the user ID and the access token are stored in an associated manner; however, identification information stored in association with an access token is not limited to the user ID. For example, an access token and a client ID for identifying the display device 4 or a browser or an application operable in the display device 4 may be stored in an associated manner. The identification information stored in association with the access token may be any information as long as the correspondence between the first channel and the second channel may be recognized.

2-7. Order of Authentication

In the above-described exemplary embodiment, if user authentication of the first communication protocol (HTTP) is successful, the information processing apparatus 10 transmits the access token through the communication path of HTTP, and uses the access token as authentication information for communication using the second communication protocol (WebSocket). Instead of this, authentication information used for communication of the first communication protocol may be transmitted through the communication path of the second communication protocol. In this case, the information processing apparatus 10 may establish a channel of WebSocket to the display device 4 and execute authentication, and then may transmit authentication information (an access token etc.) used for communication of HTTP through the channel of WebSocket. The display device 4 may transmit the authentication information received from the information processing apparatus 10, in a manner included in a HTTP request, and may transmit the HTTP request to the information processing apparatus 10.

2-8. Standard of Communication

In this exemplary embodiment, the user device 20 includes the communication unit that executes wireless communication conforming to the standard of wireless LAN; however, it is not limited thereto. For example, the user device 20 may include a communication unit that executes communication conforming to the standard of wired LAN similarly to the communication unit 33 of the operation device 30. In this case, the user device 20 is connected through a communication cable to a router or a hub of the wired LAN. The communication unit of the user device 20 in this case also functions as a communication unit that communicates with the above-described other communication device (router or hub). Alternatively, the user device 20 may include a communication unit that executes wireless communication conforming to, for example, the standard of Bluetooth (registered trademark) or NFC (Near field communication) as a communication unit that executes wireless communication.

In the exemplary embodiment, the first communication unit of the information processing apparatus 10 has communication with the communication unit of the operation device 30 under the standard of wired LAN; however, it is not limited thereto. For example, communication conforming to USB (Universal Serial Bus), or HDMI (registered trademark) (High-Definition Multimedia Interface) may be executed, or wireless communication conforming to the standard of wireless LAN, Bluetooth (registered trademark), or NFC (Near field communication) may be executed. In any of these cases, the communication unit of the operation device 30 communicates with the first communication unit of the information processing apparatus 10 without the communication device such as a router or a hub. As described above, the communication unit of the operation device 30 functions as a communication unit that communicates with the information processing apparatus 10 without the other communication device.

Also, in the above-described exemplary embodiment, the information processing apparatus 10 and the display device 4 exchange data by using the two types of communication protocols of HTTP and WebSocket; however, the communication protocols to be used are not limited thereto. The communication protocols to be used by the information processing apparatus 10 and the display device 4 may be any communication protocols as long as these are a first communication protocol that synchronously exchange information such that the information processing apparatus 10 (web server) transmits a response to a request transmitted from the display device 4 (web client), and a second communication protocol for asynchronously transmission of a notification from the information processing apparatus 10 to the display device 4.

Also, in the above-described exemplary embodiment, the information processing apparatus 10 and the display device 4 may exchange data under the standard of SOAP (Simple Object Access Protocol). Also, the conforming protocol when data is exchanged between the information processing apparatus 10 and the display device 4 is not limited thereto. The information processing apparatus 10 and the display device 4 may communicate with each other under, for example, REST (Representational State Transfer) or SGML (Standard Generalized Markup Language).

2-9. Configuration of Operation Device

The operation device 30 includes the controller, the memory, and the communication unit as shown in FIG. 5 according to the exemplary embodiment; however, the operation device 30 may not include these units.

Figure 19:
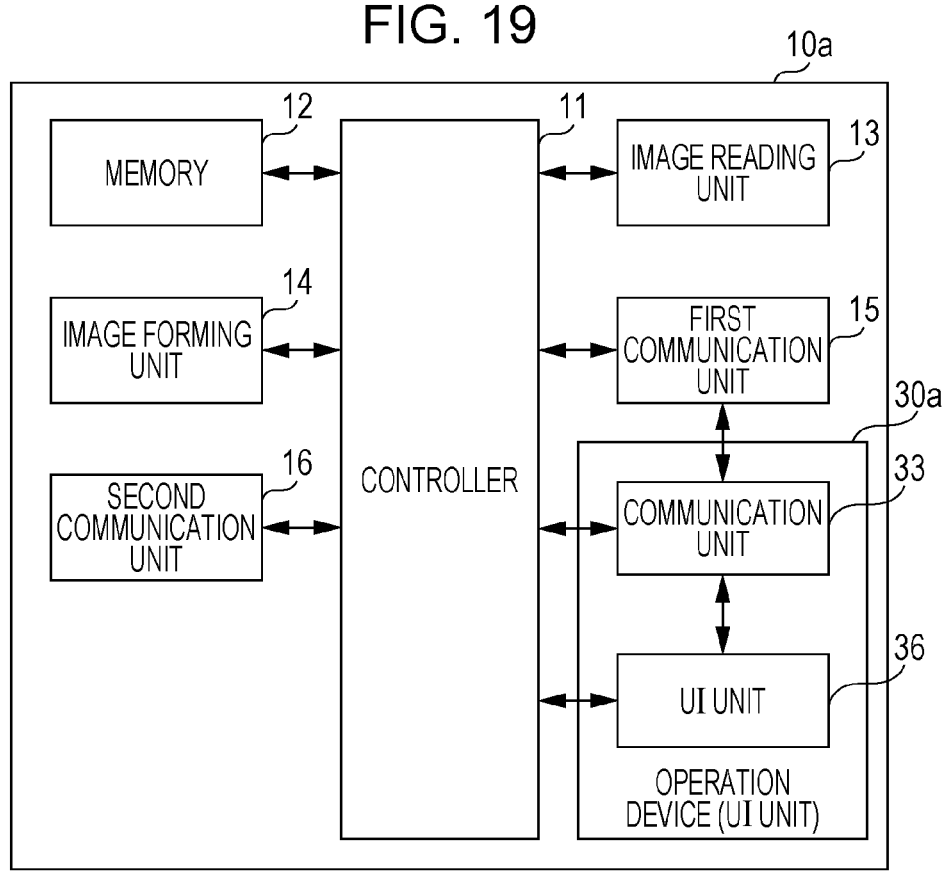
FIG. 19 is an illustration showing an example of a hardware configuration of an information processing apparatus according to a modification.

FIG. 19 is an illustration showing an example of a hardware configuration of an information processing apparatus 10*a* according to a modification. In the example in FIG. 19, the information processing apparatus 10*a* including the respective units in FIG. 6 excluding the operation device 30, and an operation device 30*a* are shown. In this modification, the operation device 30*a* is fixed to the housing of the information processing apparatus 10*a*. The operation device 30*a* includes the communication unit 33 shown in FIG. 5 and a UI unit 36.

The communication unit 33 and the UI unit 36 are connected to a bus in the information processing apparatus 10*a*, and are controlled by the controller 11. The communication unit 33 is also connected to the first communication unit 15. The UI unit 36 includes a display screen and a touch sensor overlaid on the display screen. The UI unit 36 receives an operation from a user, and displays an image. The UI unit 36 supplies operation data corresponding to the received operation of the user to the controller 11. The controller 11 executes processing corresponding to the operation data. In this modification, the controller 11 executes a program of a browser, and hence realizes the functions of the display device 4 shown in FIG. 7.

2-10. Installation of Operation Device

The operation device is fixed to the housing of the information processing apparatus according to the exemplary embodiment and the above-described modification; however, the operation device may not be fixed to the housing. For example, the operation device may be used as a remote controller without being fixed to the housing of the information processing apparatus.

Figure 20:
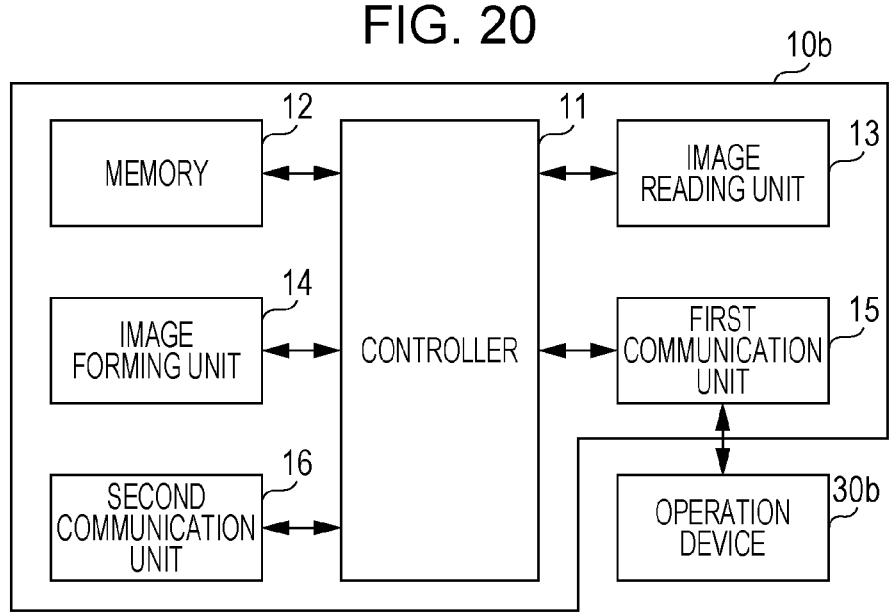
FIG. 20 is an illustration showing an example of a hardware configuration of an information processing apparatus according to another modification.

FIG. 20 is an illustration showing an example of a hardware configuration of an information processing apparatus 10*b* according to a modification. In the example in FIG. 20, the information processing apparatus 10*b* including the respective units in FIG. 6 excluding the operation device 30, and an operation device 30*b* are shown. The operation device 30*b* includes the respective units shown in FIG. 5, and functions as the display device 4 shown in FIG. 7. The housing of the information processing apparatus 10*b* has a portion in which the operation device 30*b* may be installed (hereinafter, referred to as "installation portion").

The operation device 30*b* is connected to the first communication unit 15 through a communication cable, and is used by a user in an installed state in the installation portion. The operation device 30*b* is used as a local display device 4 that communicates with the information processing apparatus 10*b* without other communication device similarly to the operation device 30 according to the exemplary embodiment. The user may remove the cable from the operation device 30*b*, and bring the operation device 30*b* to other location, and use the operation device 30*b* for other purpose of use. In the example in FIG. 20, instead of the operation device 30*b*, other device that functions as an operation unit (for example, the user device 20 shown in FIG. 1 etc.) may be connected. Alternatively, the operation device 30*b* may be connected to the communication device 3, and may communicate with the information processing apparatus 10*b* through the communication device 3 and the communication line 2.

2-11. Processing Executed by Information Processing Apparatus 10

In the above-described exemplary embodiment, the operation in case of copy processing is described. However, the processing to be executed by the information processing apparatus 10 is not limited to the copy processing. The processing to be executed by the information processing apparatus 10 may be the above-described image reading processing or image forming processing.

2-12. Receiving Method of Operation

In the above-described exemplary embodiment, the controller 21 receives an operation of the user by the touch sensor; however, a receiving method of an operation of the user is not limited thereto. For example, if the display device 4 is a tablet terminal, an operation may be received with a button provided at the housing. Also, if the display device 4 is a personal computer, an operation may be received with a keyboard or a mouse.

2-13. Transmission of Message

The event notifying unit 62 transmits data, which is notified as message information by using the communication protocol conforming to the standard of WebSocket in the exemplary embodiment; however, it is not limited thereto. For example, by using a technique called Comet, the event notifying unit 62 may hold a HTTP request transmitted from the UI controller 41 of the display device 4, and the event notifying unit 62 may transmit status information in response to the held HTTP request by a trigger that a message to be transmitted (for example, update of status information) is generated. With the method using Comet, similarly to the exemplary embodiment, the status of processing is quickly transmitted to the user as compared with a case in which the transmission is executed in response to the request from the operation device.

2-14. Execution of Authentication

In this exemplary embodiment, the authentication executed when the user U1 uses the various functions provided by the information processing apparatus 10 by operating the display device 4 is described with reference to the sequence diagram shown in FIG. 16 etc.; however, the timing at which the authentication is executed is not limited thereto. For example, the authentication may be executed when the user U1 operates the display device 4 for log-in and the display device 4 establishes connection to the information processing apparatus 10.

2-15. Category of Invention

In addition to the information processing apparatus, the display device, the communication device, and the information processing system including these apparatus and devices, the present invention may be interpreted as an image processing method for realizing processing executed by these apparatus and devices. Also, the present invention may be interpreted as a program for causing a computer serving as any of the information processing apparatus and the display device to function as the above-described respective units. This program may be provided in the form of storage medium such as an optical disc storing the program, or may be provided by downloading the program in a computer through a communication line such as the Internet, installing the program in the computer, and using the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
at least one processor which implements:
a first receiving unit configured to receive authentication information from software that functions as a web client through a first communication path using a first communication protocol;
a transmitting unit configured to, if authentication using the received authentication information is successful, permit communication through the first communication path, and transmit access permission information to the software through the first communication path;
a second receiving unit configured to receive an establishment request for a second communication path using a second communication protocol different from the first communication protocol, from the software; and
an establishing unit configured to, if the transmitted access permission information is included in the received establishment request, establish the second communication path to the software,
wherein the second receiving unit is further configured to, if the second communication path is disconnected, receive the establishment request for the second communication path including the transmitted access permission information to the software through the first communication path, and
wherein, if establishment of the second communication path has failed, the second receiving unit is further configured to receive an acquisition request for the access permission information through the first communication path.

2. The information processing apparatus according to claim 1,
wherein the access permission information has set therein a term of validity, and
wherein the establishing unit is further configured to not establish the second communication path if the term of validity of the access permission information included in the establishment request has elapsed.

3. The information processing apparatus according to claim 1, wherein, if an acquisition request for the access permission information is received through the first communication path permitted for the communication from the software after the established second communication path is disconnected, the transmitting unit is further configured to transmit the access permission information to the software through the first communication path.

4. The information processing apparatus according to claim 1, further comprising a disconnecting unit configured to, if the established second communication path is disconnected, disconnect the first communication path to the software to which the disconnected second communication path has been established.

5. The information processing apparatus according to claim 1, wherein the access permission information comprises an access token.

6. The information processing apparatus according to claim 5, wherein the access token is configured to establish a WebSocket session.

7. An information processing apparatus, comprising:
at least one processor which implements:
an acquiring unit configured to acquire authentication information;

a first transmitting unit configured to transmit the acquired authentication information to software that functions as a server through a first communication path using a first communication protocol;

a receiving unit configured to receive access permission information from the software through the first communication path; and a second transmitting unit configured to transmit an establishment request for a second communication path using a second communication protocol different from the first communication protocol, to the software through the first communication path, the establishment request including the received access permission information; and a third transmitting unit configured to, if the second communication path is disconnected, transmit the establishment request for the second communication path including the received access permission information to the software through the first communication path, wherein, if establishment of the second communication path has failed, the third transmitting unit is further configured to transmit an acquisition request for the access permission information through the first communication path.

8. A system, comprising:

a first information processing apparatus; and a second information processing apparatus, wherein the first information processing apparatus includes at least one first processor which implements a first receiving unit configured to receive authentication information from first software that functions as a client through a first communication path using a first communication protocol, a transmitting unit configured to, if authentication using the received authentication information is successful, permit communication through the first communication path, and transmit access permission information to the first software through the first communication path, a second receiving unit configured to receive an establishment request for a second communication path using a second communication protocol different from the first communication protocol, from the first software, and an establishing unit configured to, if the transmitted access permission information is included in the received establishment request, establish the second communication path to the first software, and wherein the second information processing apparatus includes at least one second processor which implements an acquiring unit configured to acquire the authentication information, a first transmitting unit configured to transmit the acquired authentication information to second software that functions as a server through the first communication path, a receiving unit configured to receive the access permission information from the second software through the first communication path, and a second transmitting unit configured to transmit the establishment request for the second communication path, to the second software through the first communication path, the establishment request including the received access permission information, and a third transmitting unit configured to, if the second communication path is disconnected, transmit the establishment request for the second communication path including the received access permission information to the second software through the first communication path, and wherein, if establishment of the second communication path has failed, the third transmitting unit is further configured to transmit an acquisition request for the access permission information through the first communication path.

9. The system according to claim 8, wherein the access permission information has set therein a term of validity, and wherein the establishing unit is further configured to not establish the second communication path if the term of validity of the access permission information included in the establishment request has elapsed.

10. A non-transitory computer readable medium storing a program causing a computer to execute a process for information processing, the process comprising:

receiving authentication information from software that functions as a client through a first communication path using a first communication protocol;

if authentication using the received authentication information is successful, permitting communication through the first communication path, and transmitting access permission information to the software through the first communication path;

receiving an establishment request for a second communication path using a second communication protocol different from the first communication protocol, from the software; and if the transmitted access permission information is included in the received establishment request, establishing the second communication path to the software;

if the second communication path is disconnected, receiving the establishment request for the second communication path including the transmitted access permission information to the software through the first communication path; and if establishment of the second communication path has failed, receiving an acquisition request for the access permission information through the first communication path.

11. The non-transitory computer readable medium according to claim 10, wherein the access permission information has set therein a term of validity, and wherein the process further comprises not establishing the second communication path if the term of validity of the access permission information included in the establishment request has elapsed.

12. A non-transitory computer readable medium storing a program causing a computer to execute a process for information processing, the process comprising:

acquiring authentication information;

transmitting the acquired authentication information to software that functions as a server through a first communication path using a first communication protocol;

receiving access permission information from the software through the first communication path; and transmitting an establishment request for a second communication path using a second communication protocol different from the first communication protocol, to the software through the first communication path, the establishment request including the received access permission information;

if the second communication path is disconnected, transmitting the establishment request for the second communication path including the received access permission information to the software through the first communication path; and if establishment of the second communication path has failed, transmitting an acquisition request for the access permission information through the first communication path.

13. The non-transitory computer readable medium according to claim 12, wherein the process further comprises:

transmitting, if the second communication path is disconnected, the establishment request for the second communication path including the received access permission information to the software through the first communication path; and transmitting, if establishment of the second communication path has failed, an acquisition request for the access permission information through the first communication path.

14. An information processing method comprising:

receiving authentication information from software that functions as a web client through a first communication path using a first communication protocol;

if authentication using the received authentication information is successful, permitting communication through the first communication path, and transmitting access permission information to the software through the first communication path;

receiving an establishment request for a second communication path using a second communication protocol different from the first communication protocol, from the software; and if the transmitted access permission information is included in the received establishment request, establishing the second communication path to the software;

if the second communication path is disconnected, receiving the establishment request for the second communication path including the transmitted access permission information to the software through the first communication path; and if establishment of the second communication path has failed, receiving an acquisition request for the access permission information through the first communication path.

15. The information processing method according to claim 14, wherein the access permission information has set therein a term of validity, and wherein the method further comprises not establishing the second communication path if the term of validity of the access permission information included in the establishment request has elapsed.

* * * * *